US012383832B2

(12) United States Patent
Cao

(10) Patent No.: US 12,383,832 B2
(45) Date of Patent: Aug. 12, 2025

(54) AUDIO PROCESSING METHOD AND APPARATUS

(71) Applicant: Tencent Technology (Shenzhen) Company Limited, Guangdong (CN)

(72) Inventor: Muyong Cao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 267 days.

(21) Appl. No.: 18/223,711

(22) Filed: Jul. 19, 2023

(65) Prior Publication Data

US 2023/0364513 A1 Nov. 16, 2023

Related U.S. Application Data

(63) Continuation of application No. PCT/CN2022/126681, filed on Oct. 21, 2022.

(30) Foreign Application Priority Data

Dec. 1, 2021 (CN) .......................... 202111460896.8

(51) Int. Cl.
*A63F 13/50* (2014.01)
*A63F 13/424* (2014.01)
*A63F 13/54* (2014.01)

(52) U.S. Cl.
CPC ............ *A63F 13/54* (2014.09); *A63F 13/424* (2014.09); *A63F 2300/6063* (2013.01)

(58) Field of Classification Search
CPC .................... A63F 13/54; A63F 13/424; A63F 2300/6063; A63F 13/215; H04S 7/30
See application file for complete search history.

(56) References Cited

U.S. PATENT DOCUMENTS

| 12,100,416 B2 * | 9/2024 | Charantimath | ......... G10L 25/30 |
| 2002/0105521 A1 | 8/2002 | Kurzweil | |

(Continued)

FOREIGN PATENT DOCUMENTS

| CN | 1767445 | 5/2006 |
| CN | 107998658 | 5/2018 |

(Continued)

OTHER PUBLICATIONS

B3 Chinese Office Action issued Aug. 22, 2022 in corresponding Chinese Application No. 202111460896.8.

(Continued)

*Primary Examiner* — Pegeman Karimi
(74) *Attorney, Agent, or Firm* — Crowell & Moring LLP

(57) ABSTRACT

An audio processing method and apparatus are provided. The method includes: obtaining a voice audio of a first game user and spatial position information of a first virtual object controlled by the first game user in a game scene; performing conversion processing on the voice audio of the first game user to obtain a target audio matching a character attribute of the first virtual object; and transmitting the target audio and the spatial position information of the first virtual object to a second terminal such that the second terminal plays the target audio according to the spatial position information of the first virtual object, a second virtual object controlled by a second game user using the second terminal and the first virtual object being in a same game scene.

20 Claims, 10 Drawing Sheets

(56) References Cited

U.S. PATENT DOCUMENTS

| | | | |
|---|---|---|---|
| 2008/0008342 A1* | 1/2008 | Sauk .................. | H04S 1/002 |
| | | | 381/315 |
| 2010/0197401 A1* | 8/2010 | Altshuler ............ | A63F 13/10 |
| | | | 463/35 |
| 2011/0249024 A1* | 10/2011 | Arrasvuori .......... | G06F 3/017 |
| | | | 715/863 |
| 2020/0142665 A1 | 5/2020 | Dantrey et al. | |

FOREIGN PATENT DOCUMENTS

| | | |
|---|---|---|
| CN | 112316427 | 2/2021 |
| CN | 114143700 | 3/2022 |

OTHER PUBLICATIONS

International Search Report issued Jan. 9, 2023 in International (PCT) Application No. PCT/CN2022/126681.

\* cited by examiner

AUDIO PROCESSING METHOD AND APPARATUS

RELATED APPLICATION

This application is a continuation application of PCT Patent Application No. PCT/CN2022/126681, filed on Oct. 21, 2022, which claims priority to Chinese Patent Application No. 202111460896.8, filed with the China Patent Office on Dec. 1, 2021 and entitled "AUDIO PROCESSING METHOD, APPARATUS AND DEVICE, MEDIUM AND PROGRAM PRODUCT", wherein the content of the above-referenced applications is incorporated herein by reference in its entirety.

FIELD OF THE TECHNOLOGY

This application relates to the field of computer technologies, specifically relates to the field of artificial intelligence, and in particular, to an audio processing method, an audio processing apparatus, an audio processing device, a computer readable storage medium, and a computer program product.

BACKGROUND OF THE DISCLOSURE

Many application scenes (such as live streaming scenes, game scenes, and video conferencing scenes) relate to the processing of sound. For example, the game scene supports collection of voice of a game user, obtains a voice audio of the game user, and transmits the voice audio to other game users in the game to realize voice communication between a plurality of game users in the game scene.

SUMMARY

Embodiments of this disclosure provide an audio processing method performed by a first terminal. The method includes:
  obtaining a voice audio of a first game user and spatial position information of a first virtual object controlled by the first game user in a game scene;
  performing conversion processing on the voice audio of the first game user to obtain a target audio matching a character attribute of the first virtual object; and
  transmitting the target audio and the spatial position information of the first virtual object to a second terminal such that the second terminal plays the target audio according to the spatial position information of the first virtual object, a second virtual object controlled by a second game user using the second terminal and the first virtual object being in a same game scene.

Embodiments of this disclosure provide an audio processing method performed by a second terminal. The method includes:
  receiving a target audio of a first game user and spatial position information of a first virtual object from a first terminal, the first virtual object being a virtual object controlled by the first game user using the first terminal in a game scene, and the target audio being an audio obtained by performing conversion processing on a voice audio of the first game user and the target audio matching a character attribute of the first virtual object; and
  playing the target audio according to the spatial position information of the first virtual object, the first virtual object and a second virtual object controlled by a second game user being in a same game scene.

Embodiments of this disclosure provide an audio processing apparatus. The apparatus includes: a memory operable to store computer-readable instructions and a processor circuitry operable to read the computer-readable instructions. When executing the computer-readable instructions, the processor circuitry is configured to:
  obtain a voice audio of a first game user and spatial position information of a first virtual object controlled by the first game user in a game scene;
  perform conversion processing on the voice audio of the first game user to obtain a target audio matching a character attribute of the first virtual object; and
  transmit the target audio and the spatial position information of the first virtual object to a second terminal such that the second terminal plays the target audio according to the spatial position information of the first virtual object, a second virtual object controlled by a second game user using the second terminal and the first virtual object being in a same game scene.

Embodiments of this disclosure provide a computer readable storage medium storing a computer program, the computer program being loaded by a processor to execute the audio processing method.

Embodiments of this disclosure also provide a computer program product or a computer program, the computer program product or the computer program including a computer instruction stored in a computer readable storage medium. A processor of the audio processing device reads a computer instruction from a computer readable storage medium, the computer instruction, when executed by the processor, implementing the audio processing method.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

However, it is found through practices that a related game scene provides a user with a relatively simple and direct voice audio processing mode, that is, after a voice audio of a game user is encoded, it is directly transmitted to other game users for voice audio playback. This makes the sound effect presented during voice audio playback flat, which does not reflect a stereoscopic spatial relationship between game characters controlled by a plurality of game users, and the timbre of the voice audio is similar to the sound of the game user in the real world, resulting in the lack of privacy of the voice audio in the game scene.

The embodiments of this disclosure provide an audio processing method, apparatus and device, a medium and a program product, which can improve the stereoscopic spatial sense of the voice audio in the game scene and increase the privacy of the voice audio.

Figure 1:
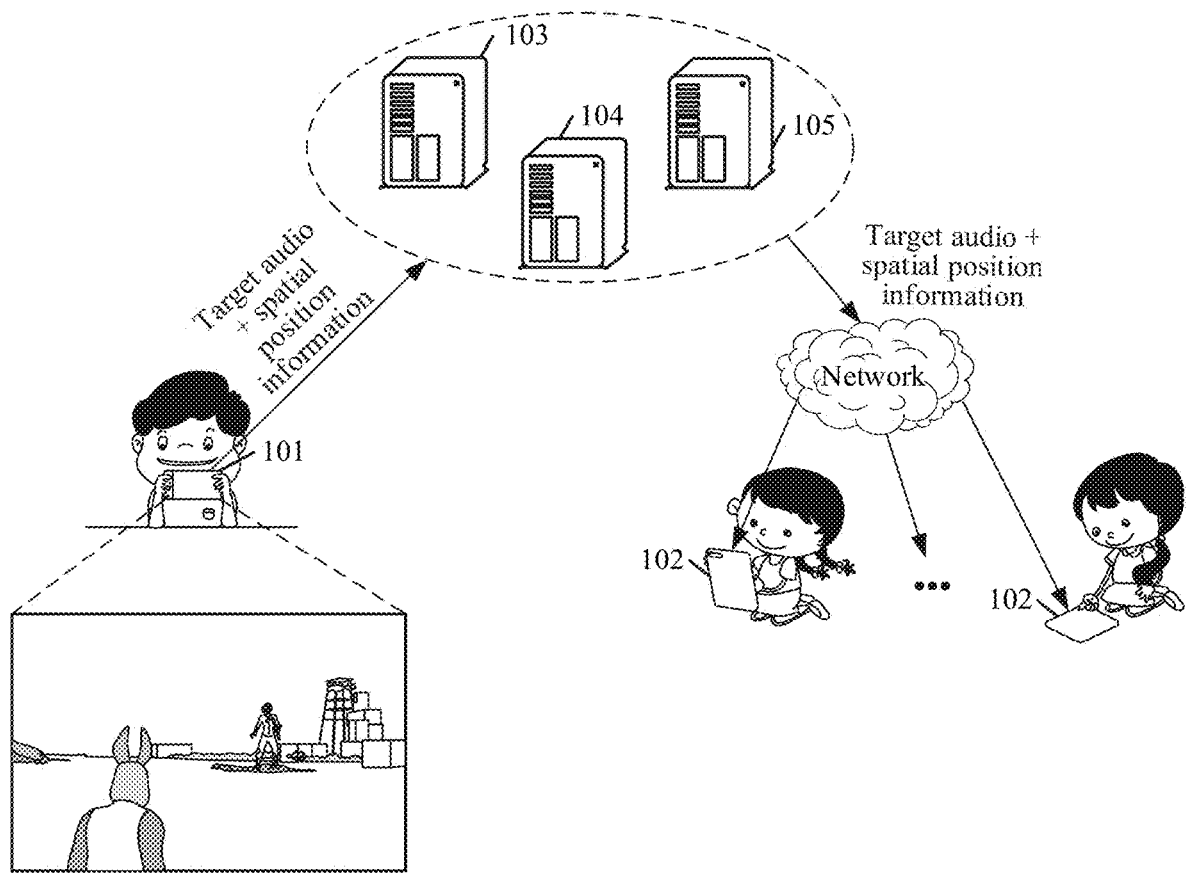
FIG. 1 is a schematic architecture diagram of an audio processing system according to an exemplary embodiment of this disclosure.

The embodiments of this disclosure relate to an audio processing system adapted to the audio processing method according to an embodiment of this disclosure. The schematic architecture diagram of the audio processing system is as shown in FIG. 1. The audio processing system includes a plurality of terminals (such as a terminal 101, a terminal 102, ...) and servers (such as a server 103, a server 104, and a server 105). The embodiments of this disclosure do not limit the number of terminals and servers. The terminal may include, but is not limited to, smartphones (such as Android phones or iOS phones), tablet computers, portable personal computers, Mobile Internet Devices (MIDs), smart TVs, vehicle-mounted devices, headset device, o other audio processing devices where screens may be touched. Application programs (referred to as applications, such as game applications, social applications, video applications, web applications, and game applets deployed in any application) may be run in the terminal. The server may include, but is not limited to, a data processing server, a Web server, an application server, a cloud server (or a cloud server for short), and other devices having complex computing capacity. The server may be a background server for any application that interacts with the terminal running any application to provide computing and application service support for any application. The server may be an independent physical server, or may be a server cluster composed of a plurality of physical servers or a distributed system. The terminal and the server may be in direct or indirect communication connection in a wired or wireless mode, and the embodiments of this disclosure do not limit the connection modes between the terminal and the server.

Based on the audio processing system, an audio processing solution based on a game scene is proposed. The so-called game scene may be a three-dimensional space scene provided by a target game and supporting one or more game players (or called game users). For example, the game scene provided by the target game may include: a scene where a virtual object (i.e., a character controlled by the game player in the target game) drives a vehicle (such as a car and a boat), a scene where a virtual object shoots with a firearm, and a scene where a virtual object parachutes. The target game may include, but is not limited to, client games, web games, applet games, cloud games, arcade games, remote control games, etc. The so-called audio refers to all the sounds that humans can hear. The audio is widely used in various fields due to its advantages of high synchronization and strong interactivity, for example, the audio is applied to the field of games. For example, assuming that the game scene includes a game user 1 and a game user 2, then a voice audio of the game user 1 may be collected and transmitted to the game user 2 to achieve information exchange between a plurality of game users in the game scene.

In a specific implementation, the general principle of the audio processing solution proposed in the embodiments of this disclosure may include: in response to obtaining a voice audio of a first game user (such as any game user) in a game scene is obtained, performing conversion processing on the voice audio, so that a target audio obtained by the conversion processing matches a character attribute of the first virtual object. This not only ensures that the target audio may accurately convey the content that the first game user wants to express, but also avoids exposing the real sound of the first game user and improves the privacy and interest of the sound by adjusting the timbre of the target audio to match the character attribute of the first virtual object. Moreover, spatial position information of a first virtual object controlled by the first game user in the game scene may also be obtained, so that in a case of playing a target audio based on the spatial position information of the first virtual object, a spatial position of the first virtual object in the game scene may be characterized, and a second game user (any game user in the game users participating in the target game other than the first game user) may be provided with a more realistic stereoscopic spatial sense.

The audio processing solution may be jointly executed by a source terminal used by the first game user, a target terminal used by the second game user, and a server, or by a target application (such as any application) running in the source terminal used by the first game user, a target application running in the target terminal used by the second game user, and a background server corresponding to the target application. For ease of explanation, the following are introduced with the source terminal, the target terminal and the server to jointly execute the audio processing solution as an example. In the audio processing system as shown in FIG. 1, the source terminal used by the first game user may be a terminal 101, the target terminal used by the second game user may be a terminal 102, and the server may be a cloud server. The cloud server may include: a cloud configuration server 103, a cloud signaling server 104, and a cloud data transmission server 105. The following is a brief introduction to the three cloud servers given.

(1) The cloud configuration server 103 may provide a configuration service for the target game, specifically to provide a configuration resource for the operation of the target game. For example, when the first game user enables the target game with the terminal 101, the terminal 101 transmits a data configuration request to the cloud configuration server 103, the data configuration request is used for requesting the cloud configuration server 103 to return a configuration resource required to initialize the target game, so that the terminal 101 initializes the target game based on the configuration resource. (2) The cloud signaling server 104 is configured to implement a communication connection between a plurality of game users participating in the target game (or a plurality of terminals used by the plurality of game users). Specifically, when the communication connection between the plurality of game users participating in the target game changes, state update may be realized through the cloud signaling server (such as update of a network state of each terminal). For example, the game user 1, the game user 2, and the game user 3 participate in a same game scene, in response to detecting that a terminal used by the game user 1 is disconnected from the cloud signaling server 104, for example, the game user 1 is offline, the cloud signaling server 104 transmits a notification message to the game user 2 and the game user 3, the notification message being used for notifying that the game user 1 is offline. (2) The cloud data transmission server 105 is configured to implement data forwarding between a plurality of game users participating in the target game (or a plurality of terminals used by the plurality of game users). For example, the cloud data transmission server 105 may be configured to forward a target audio of the first game user transmitted by the terminal 101 to the terminal 102. The above is only a brief introduction to the three cloud servers, and the three cloud servers are further introduced below in conjunction with specific embodiments.

It is to be illustrated that the number of second game users in the same game scene as the first game user may be at least two, and since the audio processing flow between any second game user and the first game user is consistent, the audio processing solution is introduced below by taking a second game user as an example. In addition, the cloud configuration server 103, the cloud signaling server 104, and the cloud data forwarding server 105 mentioned above are cloud servers independent of each other, and the terminal may interact with any one or more of the three cloud servers as required. Certainly, according to the requirements of actual applications, the embodiments of this disclosure may also relate to other types of cloud servers, and the embodiments of this disclosure do not limit the type and number of cloud servers.

Based on the audio processing solution described above, a more detailed audio processing method is proposed in the embodiments of this disclosure, and the audio processing method proposed in the embodiments of this disclosure is described in detail below in conjunction with the accompanying drawings.

Figure 2:
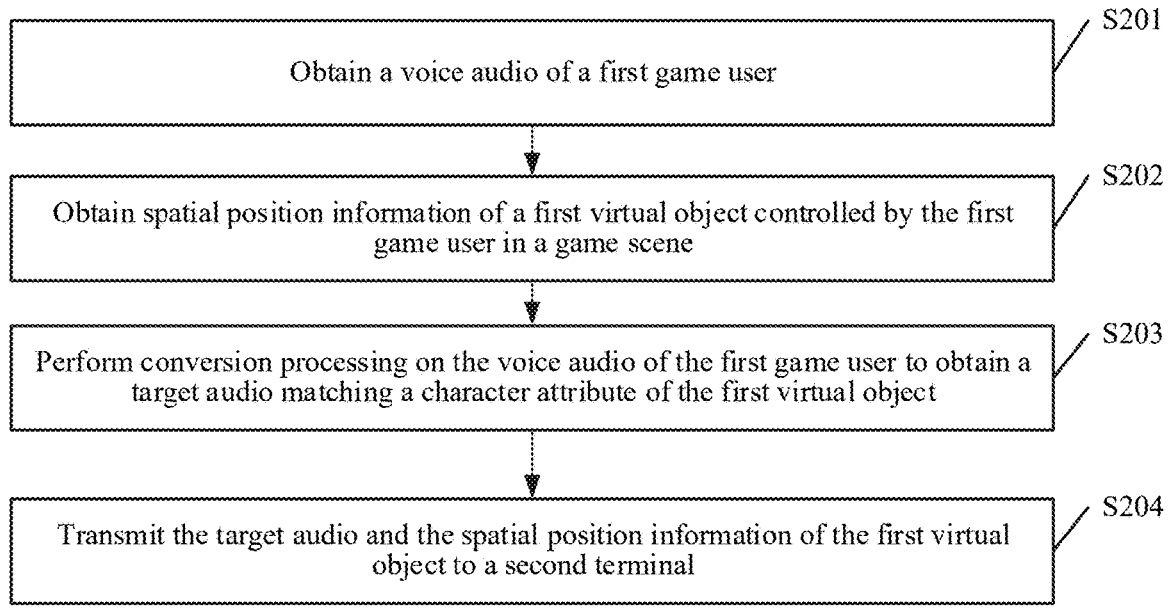
FIG. 2 is a schematic flowchart of an audio processing method according to an exemplary embodiment of this disclosure.

FIG. 2 is a schematic flowchart of an audio processing method according to an exemplary embodiment of this disclosure. The embodiments of this disclosure are illustrated by taking the audio processing method executed by the source terminal mentioned above as an example. The audio processing method may include, but is not limited to, steps S201-S204:

S201: Obtain a voice audio of a first game user.

The voice audio of the first game user refers to a digital signal obtained by performing sound collection processing on an analog signal captured by a microphone. The analog signal captured by the microphone here is obtained by the microphone to collect the sound of a physical environment where the first game user is located. The microphone may be deployed in the source terminal used by the first game user, or the microphone is an external device to the source terminal. Specifically, when the microphone is in an ON state, the microphone may collect the sound of the physical environment where the first game user is located to obtain an analog signal. Then sound collection processing is performed on the collected analog signal, and the analog signal is converted into a digital signal that may be transmitted by the device. The analog signal, also known as a continuous signal, is a physical quantity representation of continuous change between a signal and information, for example, the amplitude, frequency or phase of a signal changes continuously with time. The digital signal, also known as a discrete signal, refers to a signal that is discrete and discontinuous in value compared to the analog signal.

Figure 3:
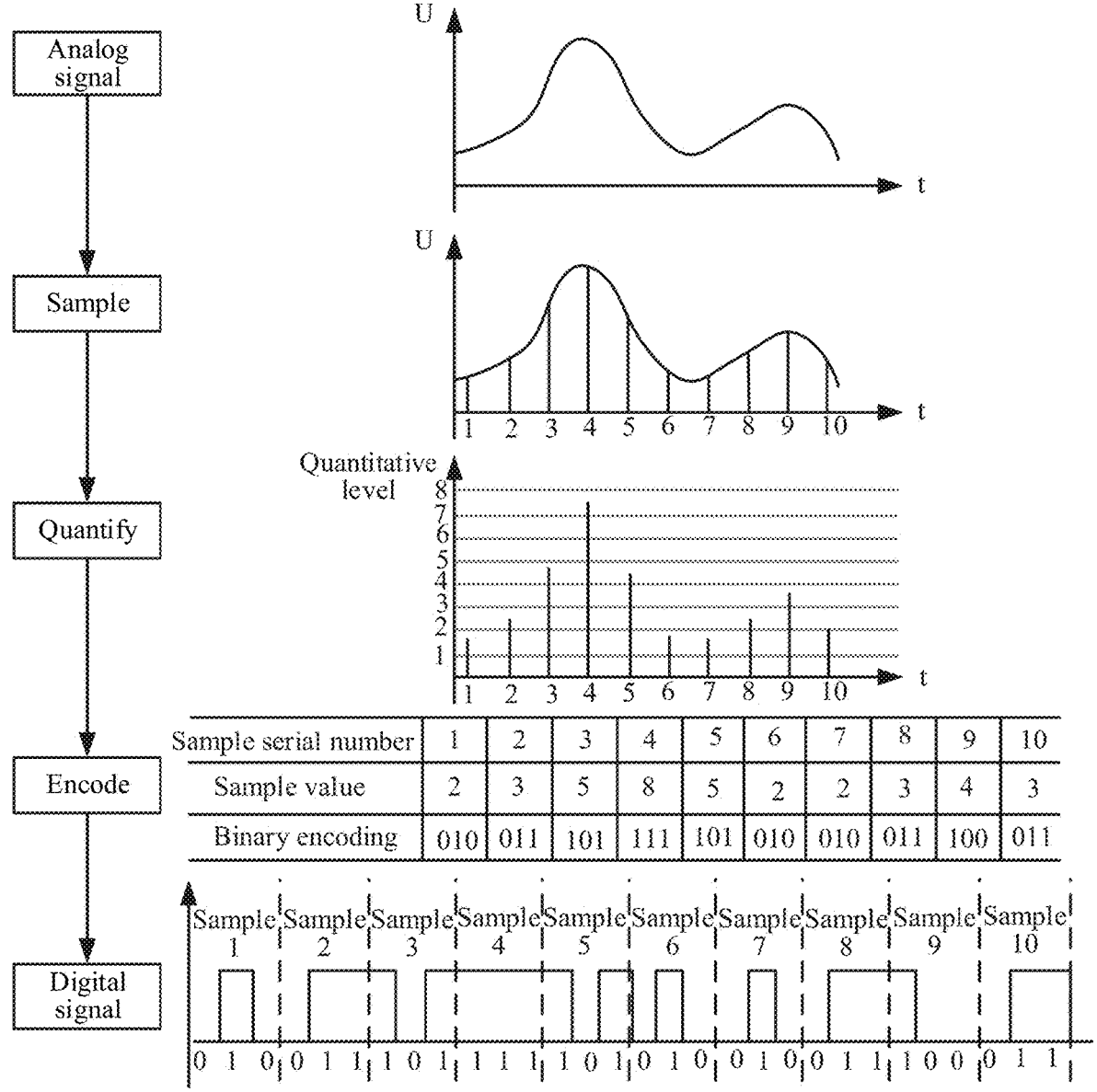
FIG. 3 is a schematic flowchart of analog-digital conversion according to an exemplary embodiment of this disclosure.

As described above, the digital signal is obtained by performing sound collection processing on the analog signal, which may be specifically generated by sampling, quantifying and encoding the analog signal by using Pulse Code Modulation (PCM). The following is a brief introduction to the process of converting the analog signal to the digital signal in conjunction with the schematic diagram of analog-digital conversion as shown in FIG. 3. As shown in FIG. 3, first, the continuously changing analog signal is sampled to obtain a discrete sampling value. Sampling refers to a process of periodically scanning the analog signal to change a time-continuous signal into a time-discrete signal. Secondly, the discrete sampling value obtained by sampling is quantified, the so-called quantification refers to a process of discretizing an instantaneous value obtained by sampling, that is, by using a set of specified levels, the instantaneous value is represented by the closest level value, usually expressed in binary. Finally, the quantification value is encoded to obtain a digital signal, the so-called encoding is to use a set of binary code groups to identify each quantification value with a fixed level. It is to be understood that the waveform of the analog signal as shown in FIG. 3 and the values of the horizontal and vertical coordinates are exemplary, and the waveform of the analog signal and the values of the horizontal and vertical coordinates in other application scenes may be adaptively changed, which is explained here.

Figure 4:
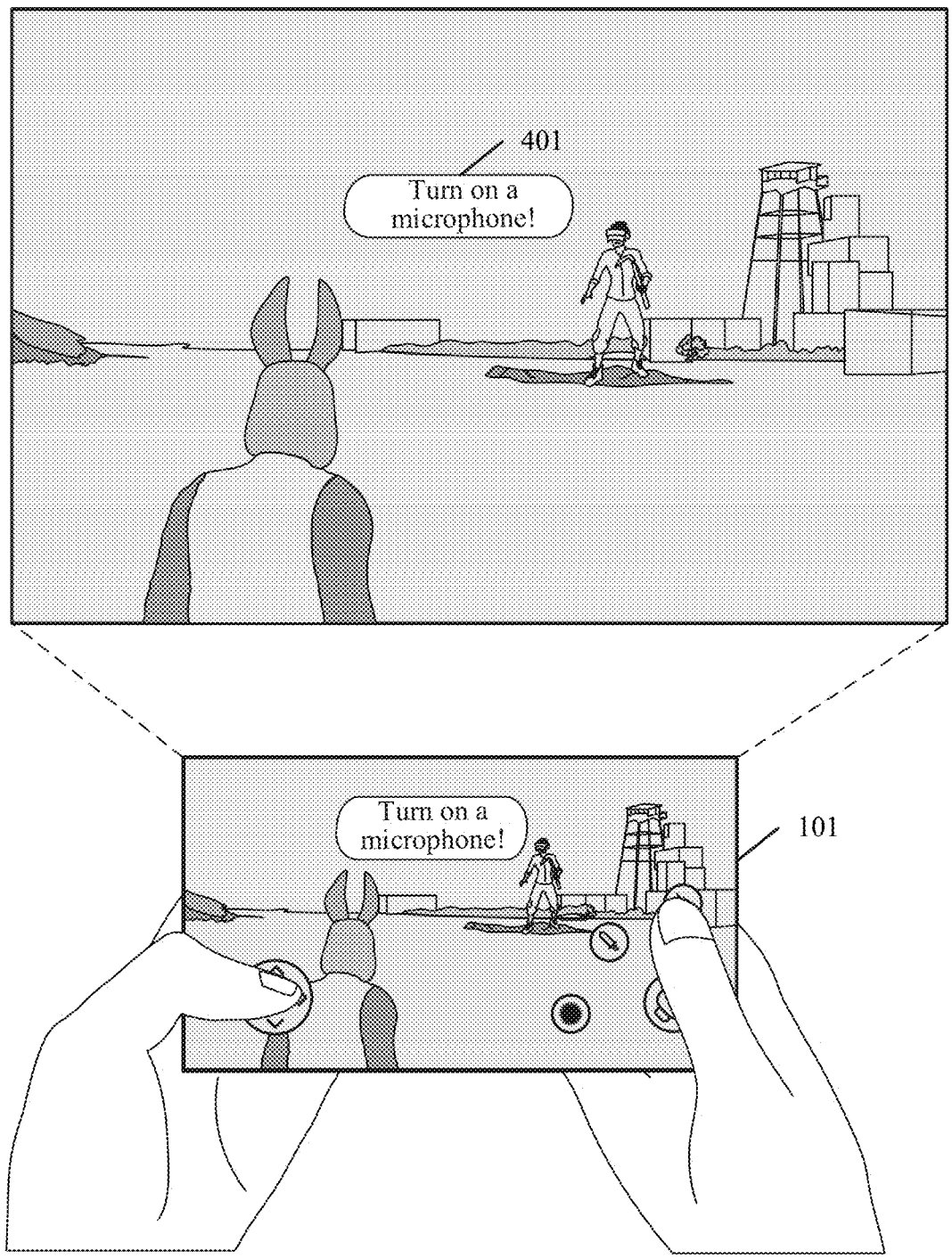
FIG. 4 is a schematic diagram of a prompt to turn on a microphone according to an exemplary embodiment of this disclosure.

A specific implementation of the analog-digital conversion as shown in FIG. 3 is performed on the analog signal collected by the microphone in the physical environment where the first game user is located, and then the analog signal may be converted into a digital signal that may be processed by the source terminal, that is, the voice audio of the first game user may be obtained. It is to be illustrated that when the microphone is in an OFF state, the embodiments of this disclosure also support prompting the first game user to turn on the microphone. For example, a prompt message is outputted on a display screen of the source terminal. The prompt message is used for prompting the first game user to turn on the microphone so as to facilitate collecting the voice audio of the first game user. For another example, a prompt voice is outputted, and the voice content of the prompt voice may be "Please turn on the microphone", and so on. Taking the microphone deployed in the source terminal as an example, when the first game user successfully logs in to the target game with an identity identification (such as a game account, a password, fingerprint information, and face information), in response to detecting that the microphone is not turned on, a prompt message (such as the prompt message 401 as shown in FIG. 4) is outputted on the display screen of the source terminal, so that the first game user may perform an operation of turning on the microphone upon seeing the prompt message. In this way, in response to the operation of the first game user of turning on the microphone, the source terminal performs a step of initializing a relevant parameter of the microphone, such as setting the microphone's collection rate (also known as a sampling frequency, which refers to the number of samples collected per unit time), the number of sound channels (that is, the number of sound wave data generated each time when collecting sound), and the number of sampling bits (that is, the number of bits used at each sampling point) to realize the activation of the microphone.

S202: Obtain spatial position information of a first virtual object controlled by the first game user in a game scene.

The first virtual object is a game character controlled by the first game user in the game scene, and actions performed by the game character (such as shooting, jumping, and running) are controlled by the first game user, and the game character may include: human or animal. The spatial position information of the first virtual object in the game scene may be used for characterizing: three-dimensional position information of the first virtual object in the game scene, that is, (X, Y, Z). X, Y, and Z respectively correspond to distances in three directions in the unit of m (or cm, km and other units), The spatial position information in the game scene may be restored to position information in the real world according to a certain proportion.

In the embodiments of this disclosure, the spatial position information of the first virtual object may include two types. In an implementation, the spatial position information of the first virtual object may include: target coordinates of the first virtual object in the game scene determined based on a coordinate origin. In another implementation, the spatial position information of the first virtual object may include: target distance information and orientation information between the first virtual object and the second virtual object in the game scene. The second virtual object here is a game character controlled by the second game user and located in the same game scene as the first virtual object. The first virtual object and the second virtual object being in the same game scene may refer to: the first game user controlling the first virtual object and the second game user controlling the second virtual object enter the same game scene (or simply understood as entering a same game room) in the target game. It is worth noting that the game scene often contains a plurality of game picture frames, and the first virtual object and the second virtual object in the same game scene are not necessarily displayed in each game picture frame of the game scene at the same time. That is, according to the game playing conditions, only the first virtual object or the second virtual object may be included in an image frame of the game scene, but the first virtual object and the second virtual object are still in the same game scene.

The following describes the two modes of determining the spatial position information of the first virtual object above.

In an implementation, the spatial position information of the first virtual object includes: target coordinates of the first virtual object in the game scene determined based on a coordinate origin. In this implementation, the implementation of obtaining spatial position information of a first virtual object controlled by the first game user in a game scene may include: first determining a target point in the game scene as a coordinate origin; then establishing a spatial coordinate system according to the coordinate origin; and finally generating target coordinates of the first virtual object based on the spatial coordinate system. The target point in the game scene may include: a camera (or called a video camera) or a light source point. The camera in the game scene is similar to human eyes and may be used for observing the game scene. The light source point in the game scene is similar to lights and is used for illuminating the game scene, so that the game scene may produce physical shadows, increasing the realism and stereoscopic sense of the game scene. The camera and the light source point in the game scene may be in the same or different positions, which is not limited in the embodiments of this disclosure.

Figure 5:
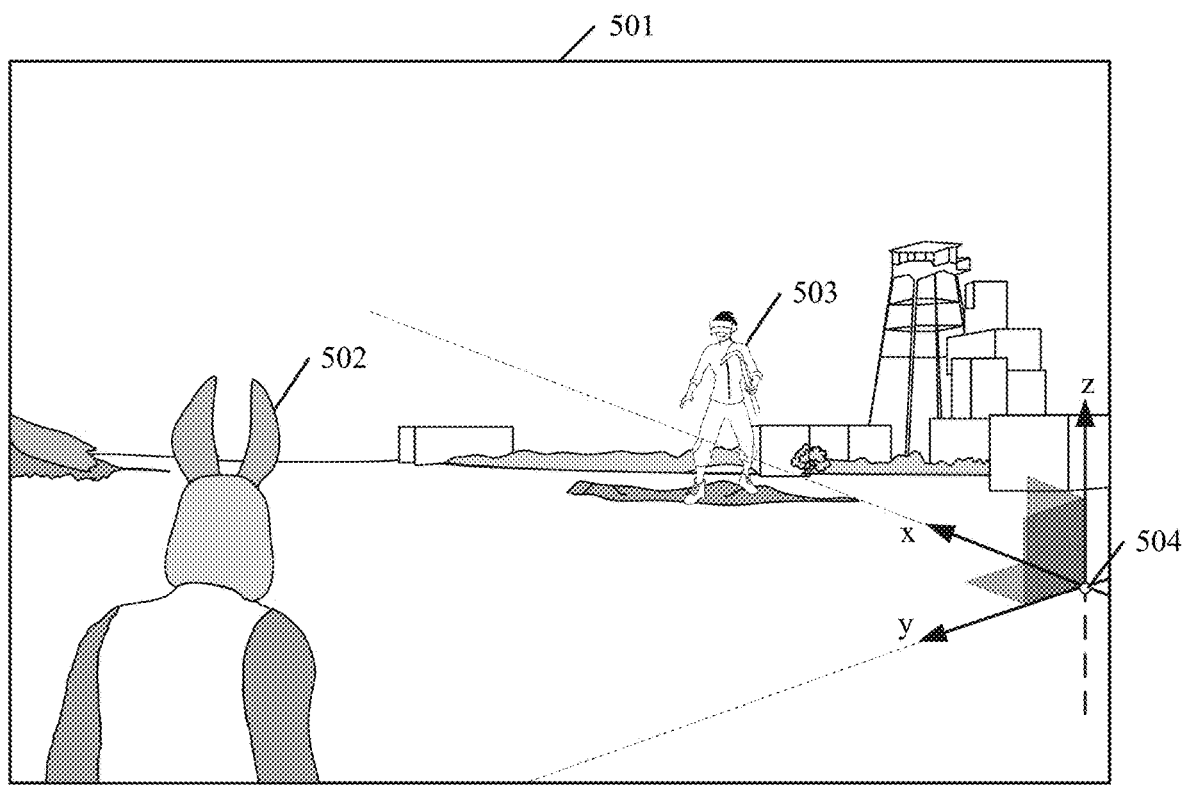
FIG. 5 is a schematic diagram of a game scene where a target point is a camera according to an exemplary embodiment of this disclosure.

An exemplary game scene where the target point is a camera may be shown in FIG. 5. As shown in FIG. 5, the game scene 501 includes a first virtual object 502 and a second virtual object 503. Assuming that the camera in the game scene 501 is located on the right position of the horizontal ground, a spatial coordinate system 504 is established based on the camera. Then it may be obtained according to a position relationship between the first virtual object 502 and the spatial coordinate system 504 shown in the game scene 501 that target coordinates (i.e., the spatial position information) of an exemplary first virtual object is (2, 10, 0). It is not difficult to understand that according to different setting positions of the camera in the game scene, or different directions of the spatial coordinate system established based on the camera, the spatial position information of the first virtual object in the game scene is not the same, and the specific value of the spatial position information of the first virtual object is not limited by the embodiments of this disclosure.

In another implementation, the spatial position information of the first virtual object includes: target distance information and orientation information between the first virtual object and the second virtual object. In this implementation, the implementation of obtaining spatial position information of a first virtual object controlled by the first game user in a game scene may include: first obtaining first position information of the first virtual object in the game scene, and second position information of the second virtual object in the game scene; then performing a distance operation on the first position information and the second position information to obtain the target distance information between the first virtual object and the second virtual object; and performing an orientation operation on the first position information and the second position information to obtain the orientation information between the first virtual object and the second virtual object. The first position information of the first virtual object in the game scene may refer to the target coordinates (or called first coordinates) of the first virtual object in the game scene determined based on the coordinate origin mentioned in the foregoing embodiments. Similarly, the second position information of the second virtual object in the game scene may refer to second coordinates of the second virtual object in the game scene determined based on the coordinate origin.

It is to be understood that when the spatial position information of the first virtual object is the target distance information and the orientation information between the first virtual object and the second virtual object, the spatial coordinate system may also be established by directly taking the first virtual object or the second virtual object as a target point. For example, when the spatial coordinate system is established by taking the first virtual object as the target point, first coordinates of the first virtual object are (0, 0, 0) by default, then only second coordinates of the second virtual object in the spatial coordinate system are calculated. To some extent, the amount of calculation of the spatial position information may be reduced, and the efficiency of data processing is improved.

Continuing with the game scene shown in FIG. 5 as an example, in the spatial coordinate system 504 established with a camera as the coordinate origin, assuming that the calculated second coordinates (i.e., the second position information) of the second virtual object are (8, 0, 1), the first coordinates (i.e., the first position information) of the first virtual object are (2, 10, 0). Then it may be obtained by performing a distance operation on the first coordinates and the second coordinates that the target distance information between the first virtual object and the second virtual object is about 11.7, and the embodiments of this disclosure do not limit the specific implementation of the distance operation between the first virtual object and the second virtual object. For example, the target distance information between the first virtual object and the second virtual object may be obtained obtaining calculating differences of coordinate values corresponding to the first coordinates and the second coordinates, and then taking a square root of a sum of squares of the three differences. Similarly, orientation information between the first virtual object and the second virtual object may be obtained by performing an orientation operation on the first coordinates and the second coordinates, which is approximately: the first virtual object is closer to the coordinate origin than the second virtual object in the x-axis direction, the first virtual object is farther away from the coordinate origin than the second virtual object in the y-axis direction, and the first virtual object is closer to the coordinate origin than the second virtual object in the z-axis direction.

In order to better understand the orientation information of the first virtual object and the second virtual object, the embodiments of this disclosure introduce a front orientation of the second virtual object to express the orientation information of the first virtual object and the second virtual object. As shown in FIG. 5, the front of the second virtual object faces a positive y-axis direction, then the orientation information between the first virtual object and the second virtual object may be expressed as: The first virtual object is located approximately 300 to the upper left of the second virtual object. Certainly, according to different front orientations of the second virtual object, the orientation information between the first virtual object and the second virtual object may be expressed as other content. For example, the front of the second virtual object faces a negative x-axis direction, the orientation information between the first virtual object and the second virtual object may be expressed as: the first virtual object is located approximately 60° to the upper right of the second virtual object.

S203: Perform conversion processing on the voice audio of the first game user to obtain a target audio matching a character attribute of the first virtual object.

As described in step S201 above, the voice audio of the first game user is obtained by performing sound collection processing on the sound of the first game user collected by the microphone, and the timbre of the voice audio is similar to the timbre of the real sound of the first game user. In response to directly playing the voice audio of the first game user, the second game user is likely to identify the real identity of the first game user based on the timbre of the voice audio of the first game user, resulting in the exposure of the real identity of the first game user. On this basis, the embodiments of this disclosure support performing conversion processing on the voice audio of the first game user, and the timbre of the target audio obtained by the conversion processing is different from the timbre of the voice audio. This ensures that the second game user cannot identify the real identity of the first game user based on the target audio, improving the privacy and interest of the sound.

In a specific implementation, the step of performing conversion processing on the voice audio of the first game user may include, but is not limited to, steps S11-S13:

s11: Perform first transformation processing on the voice audio of the first game user, and extract frequency domain information of the voice audio of the first game user.

It is to be illustrated that a sound produced in a natural environment (or the physical environment) is obtained by compounding (or superimposing) a series of vibrations of different frequencies and amplitudes emitted by a sound producing object (or referred to as a sound producing body, such as the first game user). The tone emitted by the vibration with the lowest frequency in the plurality of vibrations is called a fundamental tone. The fundamental tone is often a sound produced by the overall vibration of the sound producing object, which may decide a pitch of the sound and is used for expressing the main content of the sound. Moreover, the tones other than the tone produced by the vibration with the lowest frequency in the plurality of vibrations is called an overtone. The overtone is often a sound produced by the partial vibration of the sound producing object, which may decide the timbre of the sound (for example, the timbre is childish timbre, low-level timbre, rough timbre, etc.).

Figure 6:
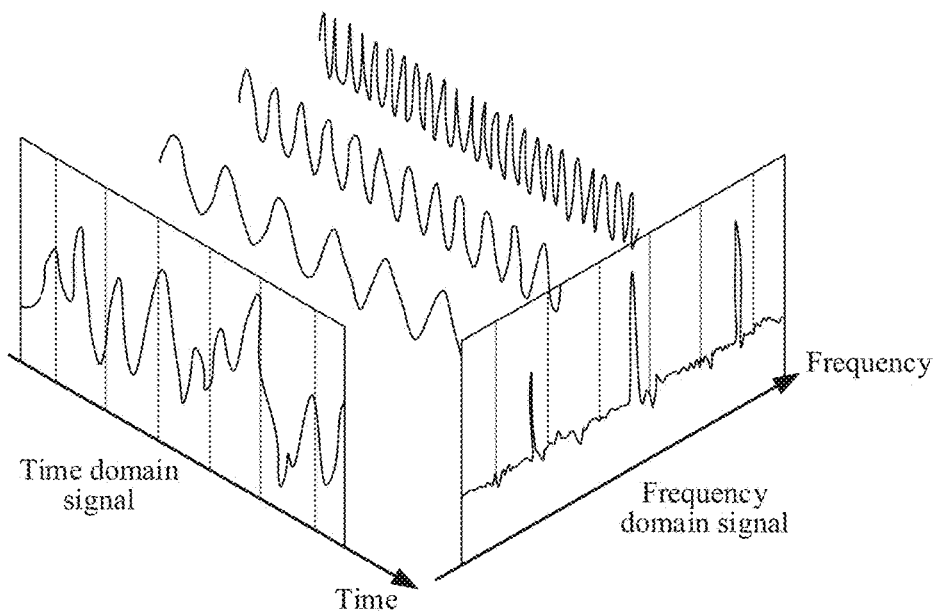
FIG. 6 is a schematic diagram of transformation of a time domain signal into a frequency domain signal according to an exemplary embodiment of this disclosure.

As can be seen from the above description of the sound, the voice audio of the first game user is a time domain signal formed by superimposing the fundamental tone and the overtone corresponding to at least one frequency. The waveform of the time domain signal reflected on a coordinate axis is represented as a signal that changes continuously over time. The horizontal coordinate of the coordinate axis is time, and the vertical coordinate is the change of signal. When the first transformation processing is performed on the voice audio, the essence is to perform first transformation processing on the waveform of the voice audio. That is, each frequency in the waveform is separated, and then expanded on the vertical axis, the horizontal coordinate is the frequency, and frequency domain information corresponding to the voice audio (or called a frequency domain signal) may be obtained. The frequency domain information includes: fundamental tone frequency domain information obtained based on frequency transformation of the fundamental tone in the voice audio, and overtone frequency domain information obtained based on frequency transformation of the overtone in the voice audio. The first transformation processing described above refers to the Fourier transformation processing (or Fourier transform for short), which is a technique of converting a signal into frequency, i.e., a method of transforming from a time domain to a frequency domain. An exemplary schematic diagram of transforming a time domain signal into a frequency domain signal may be shown in FIG. 6. As shown in FIG. 6, a frequency domain signal corresponding to the time domain signal may be obtained by separating each frequency in the waveform of the time domain signal, mapping a numerical value of each frequency to the horizontal coordinate, and mapping an amplitude value corresponding to the frequency to the vertical coordinate.

s12: Perform modification on the overtone frequency domain information according to the character attribute of the first virtual object to obtain modified overtone frequency domain information.

As described in step s11, the frequency domain information of the voice audio includes fundamental tone frequency domain information and overtone frequency domain information. The fundamental tone frequency domain information decides the content that the first game user wants to express, and the overtone frequency domain information decides the timbre of the sound of the first game user. Considering that in the game scene, it is necessary to ensure accurate transmission of the content that the first game user wants to express, and to enhance the privacy of the sound of the first game user. Therefore, the embodiments of this disclosure support modification of the overtone frequency domain information, so that the timbre indicated by the modified overtone frequency domain information is different from the timbre of the real sound of the first game user, and may correctly express the content that the first game user wants to express.

Specifically, the overtone frequency domain information may be modified according to the character attribute of the first virtual object. The specific implementation process may include: obtaining audio configuration information corresponding to the character attribute of the first virtual object, the audio configuration information including overtone configuration information; and performing modification on the overtone frequency domain information according to the overtone configuration information to obtain the modified overtone frequency domain information. That is, after obtaining audio configuration information corresponding to character attribute information of the first virtual object, the overtone frequency domain information (such as an overtone frequency band in a frequency band corresponding to the frequency domain information) may be modified by using the audio configuration information. The modification here may refer to performing gain (such as amplifying an amplitude value in the overtone frequency domain information) or attenuation (such as reducing the amplitude value in the overtone frequency domain information) on the overtone frequency domain information to obtain the modified overtone frequency domain information.

The character attribute of the first virtual object may include, but is not limited to: an age attribute, a gender attribute, an appearance attribute, etc. The timbres of the sounds corresponding to virtual objects of different character attributes are not the same. The audio configuration information corresponding to the character attribute of the first virtual object is determined based on the character attribute of the first virtual object. For example, audio configuration information 1 when a character attribute 1 of the first virtual object includes "12 years old, female" is not the same as audio configuration information 2 when a character attribute 2 of the first virtual object includes "60 years old, female", which is reflected in the timbre: the timbre expressed in the audio configuration information 1 is more immature and crisper than the timbre expressed in the audio configuration information 2. Audio configuration information of different character attributes is set by a servicer in advance, and when the first game user selects or configures the character attribute of the first virtual object, the audio configuration information corresponding to the first virtual object may be determined according to the character attribute selected or configured by the first game user. In addition, the audio configuration information corresponding to the character attribute of the first virtual object may also be generated according to the game scene. In this implementation, after the voice audios of a plurality of game players in the game scene are modified, the timbres of the modified voice audios are the same.

In conclusion, no matter whether the audio configuration information is determined according to a character configuration of the first virtual object or generated according to the game scene, after the overtone frequency domain information is modified by using the audio configuration information, the timbre indicated by the modified overtone frequency domain information is different from the timbre of the real sound of the first game user, improving the privacy of the sound. Moreover, in the implementation of determining the audio configuration information according to the character configuration of the first virtual object, because character attributes of a plurality of virtual objects controlled by a plurality of game players participating in the game scene are not the same, the overtone frequency domain information modified according to the audio configuration information corresponding to different character information is not the same, which makes the timbres of sounds produced by the plurality of game users different, so that to some extent, the uniqueness of the game sound in the game scene is realized, the interest of the target game is improved, and then the stickiness of the game user is improved.

s13: Fuse the fundamental tone frequency domain information and the modified overtone frequency domain information, and perform second transformation processing on fused frequency domain information to obtain a target audio matching the character attribute of the first virtual object.

Since the fundamental tone frequency domain information decides the content that the first game user wants to express, after fusing the fundamental tone frequency domain information and the modified overtone frequency domain information, the fused frequency domain information obtained may not only accurately express the content that the first game user wants to express, but also change the timbre of the sound of the first game user, improving the privacy of the target game. After the fused frequency domain information is obtained, the embodiments of this disclosure further perform second transformation processing on the fused frequency domain information so that the frequency domain information is transformed into a target audio corresponding to the time domain. Corresponding to the first transformation processing mentioned above, the second transformation processing here is inverse Fourier transform, which transforms a frequency domain signal into a time domain signal. The processing process of the inverse Fourier transform is similar to the processing process of the Fourier transform mentioned above, and the embodiments of this disclosure are not described in detail herein.

Through the specific implementation process shown in steps S11-S13 above, conversion processing is performed on the voice audio of the first game user to obtain the target audio with the changed timbre, that is, the conversion processing is to change the timbre of the voice audio. In this way, the voice audio matching the timbre of the real sound of the first game user is transformed into a target audio with the timbre matching the character attributes of the first virtual object. Under the premise of accurately conveying the content that the first game user wants to express, the timbre of the conveyed sound is changed, so that the second game user who participates in the same game scene as the first game user is not easy to detect the real identity of the first game user, improving the interest of the target game and the stickiness of the game user.

S204: Transmit the target audio and the spatial position information of the first virtual object to a second game user.

The embodiments of this disclosure support transmitting the target audio and the spatial position information of the first virtual object to the second game user, so that a second virtual object controlled by the second game user and the first virtual object controlled by the first game user are in a same scene. In this way, after receiving the target audio and the spatial position information of the first virtual object, the second game user may play the target audio according to the spatial position information of the first virtual object, specifically according to the target distance information and orientation information between the first virtual object and the second virtual object. For example, the spatial position information of the first virtual object indicates: when the distance between the first virtual object and the second virtual object is closer, the volume at which the target audio is played is louder, so that the second game user knows that the distance between the first virtual object and the second virtual object is closer. On the contrary, when the distance between the first virtual object and the second virtual object is larger, the volume at which the target audio is played smaller, so that the second game user knows that the distance between the first virtual object and the second virtual object is larger. For another example, the spatial position information of the first virtual object indicates: The first virtual object is located directly behind (or other direction) the second virtual object, and when the target audio is played, the sound source felt by the second game user is directly behind, which allows the second game user to feel a more stereoscopic auditory experience, improving the authenticity of the game scene.

The embodiments of this disclosure support the use of independent data channels to independently transmit the target audio and the spatial position information of the first virtual object to the second game user. Alternatively, the target audio and the spatial position information of the first virtual object are transmitted to the second game user by using a same data channel. The two transmission modes are introduced below:

1) The target audio and the spatial position information of the first virtual object are independently transmitted to the second game user by using data channels independent of each other. In the specific implementation, the target audio is encoded to generate a first audio data packet. The encoding here is not the same as the encoding in the pulse code modulation mentioned above, the encoding here is to use a compaction algorithm to compress the target audio to reduce the space occupied by the target audio, which may improve the efficiency and speed of data transmission and reduce the energy consumption of data transmission. The compression algorithm refers to an algorithm of data compression, also often referred to as signal encoding in the field of electronics and communications, including compression and reduction (or encoding and decoding). Compression may include, but is not limited to: a dictionary algorithm, a fixed bit length packing algorithm, run-length encoding (RLE), and so on. Secondly, the encoded first audio data packet is transmitted to the second game user by using a first data channel. Finally, the spatial position information of the first virtual object is transmitted to the second game user by using a second data channel. Specifically, a second audio data packet is generated based on the spatial position information of the first virtual object, and the second audio data packet is transmitted to the second game user, the content of the second audio data packet may be "pos: x=5; y=6; z=7", which indicates that the x, y, and z coordinates of the first virtual object in the game scene are 5 m, 6 m, and 7 m, respectively. Certainly, in response to a large or redundant amount of data of the spatial position information of the first virtual object, before the spatial position information of the first virtual object is transmitted by using the second data channel, the second audio data packet generated based on the spatial position information may also be encoded, and the encoded second audio data packet may be transmitted by using the second data channel. The first data channel is different from the second data channel.

Figure 7A:
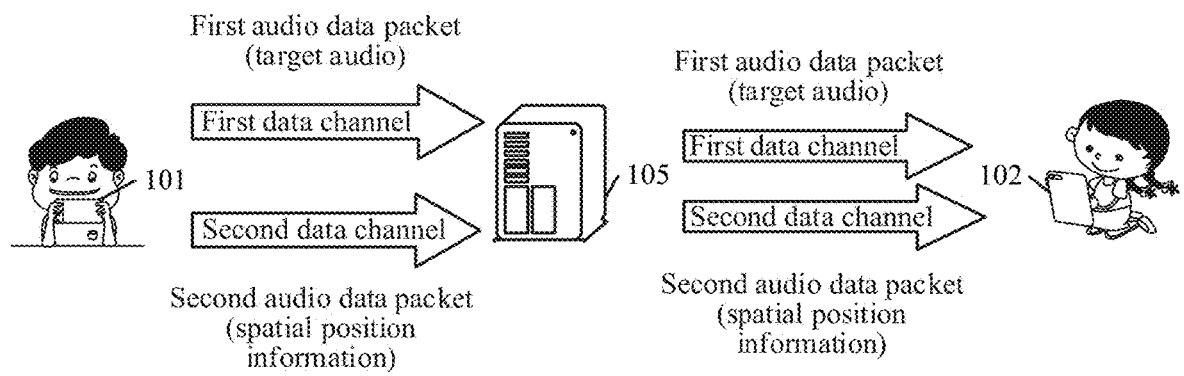
FIG. 7*a* is a schematic diagram of transmission of a target audio and spatial position information of a first virtual object through two different data channels respectively according to an exemplary embodiment of this disclosure.

FIG. 7a shows an exemplary schematic diagram of transmission of the target audio and spatial position information of the first virtual object via two different data channels respectively. As shown in FIG. 7a, a terminal 101 controlled by the first game user may transmit a first audio data packet to a cloud data forwarding server 105 by using the first data channel, so that the cloud data forwarding server 105 forwards the first audio data packet to a terminal 102 controlled by the second game user by using the first data channel. Similarly, the terminal 101 controlled by the first game user may transmit a second audio data packet to the cloud data forwarding server 105 by using the second data channel, so that the cloud data forwarding server 105 forwards the second audio data packet to the terminal 102 controlled by the second game user by using the second data channel.

It is to be illustrated that the embodiments of this disclosure do not limit the order in which the target audio and the spatial position information of the first virtual object are transmitted. That is, the target audio is transmitted to the second game user by using the first data channel, and then the spatial position information of the first virtual object is transmitted to the second game user by using the second data channel. Alternatively, the spatial position information of the first virtual object is transmitted to the second game user by using the second data channel, and then the target audio is transmitted to the second game user by using the first data channel. Alternatively, the target audio is transmitted to the second game user by using the first data channel, and the spatial position information of the first virtual object is transmitted to the second game user by using the second data channel.

Figure 7B:
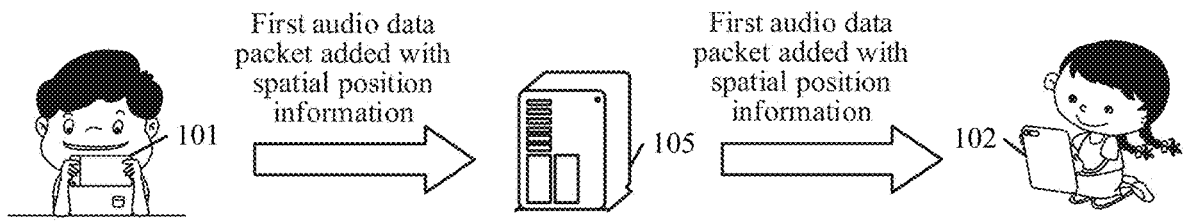
FIG. 7b is a schematic diagram of transmission of a target audio and spatial position information of a first virtual object via a same data channel according to an exemplary embodiment of this disclosure.

2) The target audio and the spatial position information of the first virtual object are transmitted to the second game user by using a same data channel. In specific implementation, the target audio is encoded to generate a first audio data packet, and the specific implementation of encoding here may refer to the related description of the specific implementation shown in the foregoing implementation 1), and details are not repeated here. Secondly, the adding the spatial position information of the first virtual object to the first audio data packet specifically may include: adding the spatial position information of the first virtual object to a packet tail or head of the first audio data packet. For example, when the spatial position information of the first virtual object is added to the packet tail of the first audio data packet, the content of the first audio data packet added with the spatial position information of the first virtual object is "[voice_data][type=pos; len=12; x=5; y=6; z=7]", indicating spatial position information with the superposition type behind the first audio data packet of "pos", the length of 12 bytes, and the value of "x=5; y=6; z=7". Finally, the first audio data packet added with the spatial position information of the first virtual object is transmitted to the second game user. FIG. 7b shows an exemplary schematic diagram of transmitting the first audio data packet added with the spatial position information of the first virtual object to the second game user.

In the embodiments of this disclosure, conversion processing may be performed on the voice audio of the first game user, so that the target audio subjected to the conversion processing matches the character attribute of the first virtual object, which ensures that the target audio may accurately convey the content that the first game user wants to express, and avoid exposing the real sound of the first game user and improve the privacy and interest of the sound by adjusting the timbre of the target audio to match the character attribute of the first virtual object. In addition, the spatial position information of the first virtual object in the game scene may be obtained, so that in a case of playing the target audio based on the spatial position information of the first virtual object, a spatial position of the first virtual object in the game scene may be characterized, and the second game user may be provided with a more realistic stereoscopic spatial sense.

Figure 8:
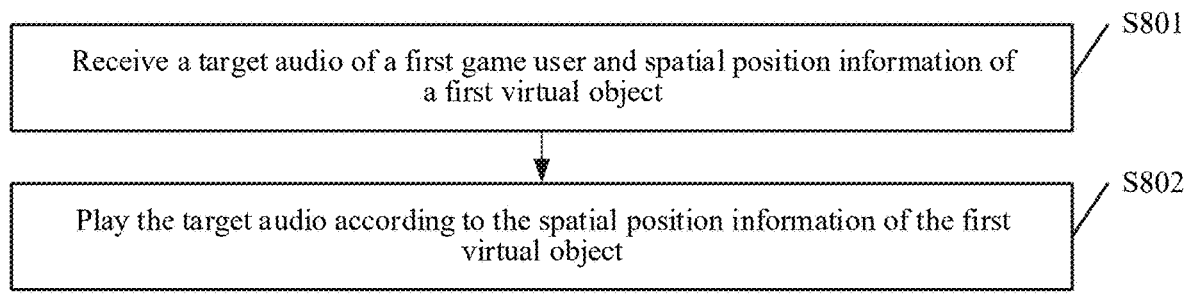
FIG. 8 is a schematic flowchart of an audio processing method according to an exemplary embodiment of this disclosure.

FIG. 8 is a schematic flowchart of an audio processing method according to an exemplary embodiment of this disclosure. The embodiments of this disclosure are described by taking the audio processing method executed by the target terminal mentioned above as an example. The audio processing method may include, but is not limited to, steps S801-S802:

S801: Receive a target audio of a first game user and spatial position information of a first virtual object.

The first virtual object is a virtual object controlled by the first game user in the game scene. The target audio is an audio obtained by performing conversion processing on a voice audio of the first game user and matching a character attribute of the first virtual object. Specifically, the specific implementation of performing conversion processing on the voice audio of the first game user to obtain a target audio may refer to the related description of the specific implementation shown in step S202 in the embodiment as shown in FIG. 2, and details are not repeated here.

As described in step S204 in the embodiment as shown in FIG. 2, the first game user may transmit the target audio and the spatial position information of the first virtual object by using independent data channels, or transmit the target audio and the spatial position information of the first virtual object by using a same data channel. When the first game user transmits the target audio by using a first data channel, and transmits the spatial position information of the first virtual object by using a second data channel, the second game user receives the target audio via the first data channel and receives the spatial position information of the first virtual object via the second data channel. Similarly, when the first game user transmits the spatial position information of the first virtual object and the target audio to the second game user by using a same data channel, the second game user receives the spatial position information of the first virtual object and the target audio by using the same data channel.

S802: Play the target audio according to the spatial position information of the first virtual object.

In specific implementation, audio playback information between the first virtual object and the second virtual object is determined based on the spatial position information of the first virtual object. The audio playback information includes audio volume information and audio orientation information. The target audio is then played according to the audio playback information. The audio volume information included in the audio playback information is determined according to target distance information between the first virtual object and the second virtual object in the game scene, and the audio volume information is used for indicating the volume size at which the target audio is played. The unit of the audio volume information may be dB, for example, the audio volume information is 100 dB. The audio orientation information included in the audio playback information is determined according to orientation information between the first virtual object and the second virtual object in the game scene, and the audio orientation information is used for indicating a direction of sound when the target audio is played. The audio orientation information may include: orientation angles of the first game virtual object and the second game virtual object in the game scene, for example, the first game virtual object is located at the upper left 300 of the second game user.

The implementations of determining the audio volume information and the audio orientation information are described below, respectively.

1) The audio playback information includes audio volume information. The implementation of determining the audio volume information based on the spatial position information of the first virtual object may include:

Target distance information between the first virtual object and the second virtual object is obtained based on the spatial position information of the first virtual object. The mode of determining the target distance information is different according to different contents included in the spatial position information of the first virtual object. For example, when the spatial position information of the first virtual object includes target coordinates of the first virtual object in the game scene determined based on a coordinate origin, second coordinates of the second virtual object may be determined in the game scene, and then the target distance information between the first virtual object and the second virtual object is calculated according to the target coordinates of the first virtual object and the second coordinates of the second virtual object. The mode of determining the second coordinates of the second virtual object in the game scene may refer to related description of the related content in the embodiment as shown in FIG. 2, and details are not repeated here. For another example, when the spatial position information of the first virtual object includes target distance information between the first virtual object and the second virtual object, the target distance information between the first virtual object and the second virtual object may be directly obtained from the spatial position information.

Figure 9:
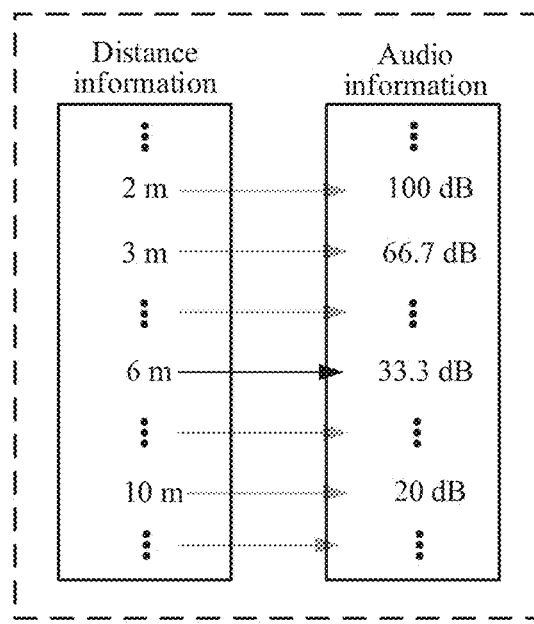
FIG. 9 is a schematic diagram of a mapping relationship between distance information and volume information according to an exemplary embodiment of this disclosure.

Secondly, a mapping relationship between different distance information and volume information is obtained. It is to be understood that volume information corresponding to each distance information may be mapped according to different distance information between the first virtual object and the second virtual object. In this way, the volume of the target audio heard by the second game user is not the same. For example, when the distance information indicates that the distance between the first virtual object and the second virtual object is 2 m, volume information having a mapping relationship to the distance information may be 100 dB (see FIG. 9). For another example, when the distance information indicates that the distance between the first virtual object and the second virtual object is 10 m, volume information having a mapping relationship to the distance information may be 20 dB (see FIG. 9). A higher decibel value indicates a louder volume that the second game user hears. It is to be illustrated that FIG. 9 merely illustrates an exemplary mapping relationship between the distance information and the audio information. In practical application scenes, according to different sound producing objects and different sound propagation media, the mapping relationship between the distance information and the audio information may not be the same as the mapping relationship as shown in FIG. 9. The embodiments of this disclosure do not define the mapping relationship between the distance information and the volume information.

Finally, the audio volume information between the first virtual object and the second virtual object is determined according to the mapping relationship and the target distance information. For example, assuming that the target distance information indicates that the distance between the first virtual object and the second virtual object is 6 m, the target distance information is matched with each distance information in the mapping relationship shown in FIG. 9, and the volume information corresponding to 6 m is about 33.3 dB, and 33.3 dB is used as the audio volume information between the first virtual object and the second virtual object.

2) The audio playback information includes audio orientation information. As described above, the spatial position information of the first virtual object may include: target coordinates of the first virtual object in the game scene determined based on a coordinate origin, or orientation information between the first virtual object and the second virtual object. The mode of determining the audio orientation information is different according to different contents included in the spatial position information of the first virtual object. For example, when the spatial position information of the first virtual object includes the target coordinates of the first virtual object in the game scene determined based on the coordinate origin, second coordinates of the second virtual object may be determined in the game scene, and then the audio orientation information between the first virtual object and the second virtual object is calculated according to the target coordinates of the first virtual object and the second coordinates of the second virtual object. The implementation of determining the second coordinates of the second virtual object in the game scene and the implementation of determining the audio orientation information according to the second coordinates of the second virtual object and the target coordinates of the first virtual object may refer to related description of the related content in the embodiment as shown in FIG. 2, and details are not repeated here. For another example, when the spatial position information of the first virtual object includes orientation information between the first virtual object and the second virtual object, the orientation information between the first virtual object and the second virtual object may be directly obtained from the spatial position information, and the orientation information is the audio orientation information.

Based on the implementation 1) and implementation 2), after obtaining the audio volume information and the audio orientation information between the first virtual object and the second virtual object, the embodiments of this disclosure then plays the target audio according to the audio volume information and the audio orientation information, so that the played target audio may reflect the distance and the direction of the first virtual object and the second virtual object in the game scene. According to different device conditions included in a physical environment where the second game user is located, the implementation of playing the target audio according to the audio volume information and the audio orientation information is not the same. The following takes the physical environment where the second game user is located including a plurality of loudspeakers, or the target terminal held by the second game user calling a target acoustic function as an example, the implementation of playing the target audio according to the audio volume information and the audio orientation information is illustratively introduced.

In an implementation, assuming that the physical environment where the second game user is located includes a plurality of loudspeakers, the plurality of loudspeakers may be adjusted first so that the adjusted loudspeakers may reflect the direction between the first virtual object and the second virtual object during playback of the target audio. Then, the target audio is played based on the audio volume information and the adjusted plurality of loudspeakers. The adjustment to the plurality of loudspeakers may include: adjusting the position, playback mode or power, etc. of the plurality of loudspeakers. The specific adjustment mode is not limited in the embodiments of this disclosure. On this basis, the distance between the first virtual object and the second virtual object may be reflected when the target audio is played according to the audio volume information, and the direction or orientation between the first virtual object and the second virtual object may be reflected when the target audio is played according to the adjusted plurality of loudspeakers, so that the sound effect produced by the plurality of loudspeakers forms a surround stereo sound effect.

In other implementations, in response to a sound positioning mode (such as HRTF mode) is enabled in the target terminal used by the second game user, a target acoustic function may be called first to filter the target audio to obtain a filtered target audio. When the filtered target audio is played, the human ear may sense which direction the first virtual object is located in the second virtual object in the game scene. Then, the filtered target audio is played according to the audio volume information, and in this case, the human ear may sense the distance between the first virtual object and the second virtual object according to the audio volume information, and sense the direction between the first virtual object and the second virtual object according to the filtered target audio. The target acoustic function may include a Head Related Transfer Functions (HRTF), and in this case, the sound effect positioning mode may refer to the HRTF mode. HRTF, also known as Anatomical Transfer Function (ATF), is a sound effect positioning algorithm.

HRTF, as a set of filters, uses Interaural Time Delay (HDITD), Interaural Amplitude Difference (IAD), auricle frequency vibration and other technologies to process the target audio in real time, so that the processed target audio may produce stereo sound, and the sound of the processed target audio is transferred to the auricle, ear canal and eardrum in the human ear, and the human ear may have the sensation of surround sound effect. Then filtering the target audio by using the head related transfer function may include: using the audio orientation information as input information of the head related transfer function to obtain a new head related transfer function; and filtering the target audio by using the new head related transfer function to obtain the filtered target audio. It is to be illustrated that embodiments of this disclosure do not limit the target acoustic function to the head related transfer function. For ease of illustration, the embodiments of this disclosure only take the target acoustic function as a head related transfer function as an example, and introduces the processing process of using the head related transfer function to the target audio.

In conclusion, the embodiments of this disclosure may play the target audio according to the audio volume information and the audio orientation information, so that the played target audio may reflect the three-dimensional spatial features, provide a stereo auditory experience, and then enhance the immersive game experience of the game user. Moreover, conversion processing may be performed on the voice audio of the first game user, so that the target audio subjected to the conversion processing matches the character attribute of the first virtual object, which ensures that the target audio may accurately convey the content that the first game user wants to express, and avoid exposing the real sound of the first game user and improve the privacy and interest of the sound by adjusting the timbre of the target audio to match the character attribute of the first virtual object.

The embodiments shown in FIG. 2 and FIG. 8 respectively describe in detail the implementation of the audio processing method for the source terminal and the target terminal, and in combination with FIG. 10, taking the audio processing method to be jointly executed by the source terminal, the target terminal and the server (such as a cloud server) as an example, the overall flow of the audio processing solution is explained below. The audio processing method includes, but is not limited to, steps S1001-S1018:

S1001: The source terminal transmits a data configuration request to a cloud configuration server.

S1002: The source terminal receives configuration information returned by the cloud configuration server in response to the data configuration request.

S1003: The source terminal initializes a target game according to the configuration information.

In steps S1001-S1003, when the first game user enables and uses the target game through the source terminal, the source terminal transmits a data configuration request to the cloud configuration server. The data configuration request is used for requesting the cloud configuration server to find and return configuration information related to the target game and the first game user. The configuration information may include a configuration resource required to run the target game. The configuration resource includes: configuration parameters (such as a resolution of a game picture, a system framework of the target game, and game data), and character attributes (such as gender and age) of the first virtual object controlled by the first game user in the game scene of the target game. Upon receiving the configuration resource returned by the cloud configuration server in response to the data configuration request, the source terminal may initialize the target game based on the configuration resource (such as loading the configuration resource running the target game), so that the first game user may successfully enable the target game.

S1004: The source terminal detects a trigger event entering a game scene of the target game.

S1005: The source terminal transmits a state change request to a cloud signaling server.

S1006: The source terminal receives a feedback result returned by the cloud signaling server.

In steps S1004-S1006, the trigger event that triggers the game scene of the target game may include: an event generated when performing a trigger operation on an entry of the game scene in a first game interface of the target game, an event generated when a game invitation of the second game user is received, an event generated when a voice signal controlling the entry of the game scene is received, and so on. When the trigger event is generated, it is indicated that the first game user wants to enter the game scene, and the source terminal may generate a state change request based on the trigger event. The state change request carries a scene identification of the game scene (such as a desert scene, a competitive scene, a snowy scene, and a rainforest scene), and the state change request is used for requesting the cloud signaling server to record relevant game data of the game scene played by the first game user (such as the game start time, the scene identification of the game scene, and related information about the second game user in the same game scene). The cloud signaling server may return the feedback result to the source terminal in response to the state change request transmitted by the source terminal. The feedback result may include: object data (such as nickname, historical game record, and game level) of the second virtual object controlled by the second game user who successfully or fails to enter the game scene and is in a same game scene as the first virtual object.

S1007: The target terminal transmits the data configuration request to the cloud configuration server.

S1008: The target terminal receives configuration information returned by the cloud configuration server in response to the data configuration request.

S1009: The target terminal initializes the target game according to the configuration information.

It is to be illustrated that the specific implementation shown in steps S1007-S1009 may be described with reference to the specific implementation shown in steps S1001-S1003, but the specific implementation shown in steps S1007-S1009 is executed by the target terminal, and the specific implementation shown in S1001-S1003 is executed by the source terminal. The specific implementation shown in steps S1007-S1009 is not repeated herein.

S1010: The target terminal detects the trigger event entering the game scene of the target game.

S1011: The target terminal transmits the state change request to the cloud signaling server.

S1012: The target terminal receives the feedback result returned by the cloud signaling server.

It is to be illustrated that the specific implementation shown in steps S1010-S1012 may be described with reference to the specific implementation shown in steps S1004-S1006, but the specific implementation shown in steps S1010-S1012 is executed by the target terminal, and the specific implementation shown in S1004-S1006 is executed by the source terminal. The specific implementation shown in steps S1010-S1012 is not repeated herein.

S1013: The source terminal obtains a voice audio of the first game user and spatial position information of the first virtual object controlled by the first game user in the game scene.

It is to be illustrated that the specific implementation of step S1013 may be described with reference to the specific implementation shown in step S201 in the embodiment as shown in FIG. 2, and details are not repeated here.

In addition, when the first game user logs in to the target game for the first time, before obtaining the voice audio of the first game user, the embodiments of this disclosure also support the first game user to select the first virtual object in the target game, so that the subsequent first game user may control the first virtual object to play the target game. Selecting the first virtual object may be understood as selecting or setting the character attribute of the first virtual object, for example, selecting the character attribute of the first virtual object as female, setting the age of the first virtual object to 20 years old, and so on. In addition, in response to detecting that the microphone is not turned on before obtaining the voice audio of the first game user, the embodiments of this disclosure also support notifying the first game user to turn on the microphone. The specific implementation process of turning on the microphone may refer to the relevant description shown in step S201 above, and details are not repeated here.

S1014: The source terminal performs conversion processing on the voice audio of the first game user to obtain a target audio matching the character attribute of the first virtual object.

It is to be illustrated that the specific implementation of step S1014 may be described with reference to the specific implementation shown in step S202 in the embodiment as shown in FIG. 2, and details are not repeated here.

Before performing conversion processing on the voice audio of the first game user, the embodiments of this disclosure also support performing sound pre-processing on the voice audio of the first game user to obtain the pre-processed voice audio. Compared with the voice audio before the pre-processing, the pre-processed voice audio filters an interference signal and a noise signal generated by an environment or circuit in the voice audio, so that the audio quality is higher and the clarity of the voice audio is improved. The sound pre-processing may include, but is not limited to: echo cancellation, noise reduction, sound activity detection and other processing methods. The specific implementation of the sound pre-processing is not limited in this embodiment of this disclosure, and is described here.

S1015: The source terminal transmits the target audio and the spatial position information of the first virtual object to a cloud data forwarding server.

It is to be illustrated that the specific implementation of step S1015 may be described with reference to the specific implementation shown in step S203 in the embodiment as shown in FIG. 2, and details are not repeated here.

S1016: The cloud data forwarding server transmits the target audio and the spatial position information of the first virtual object to the target terminal.

S1017: The target terminal receives the target audio forwarded by the cloud data forwarding server and the spatial position information of the first virtual object.

S1018: Play the target audio according to the spatial position information of the first virtual object.

It is to be illustrated that the specific implementation of steps S1016-S1018 may be described with reference to the specific implementation shown in steps S801 and S802 in the embodiment as shown in FIG. 8, and details are not repeated here.

It is to be understood that there is often more than one voice audio of the first game user collected in the source terminal, so the source terminal may perform conversion processing on a plurality of collected voice audios to generate a target audio corresponding to each voice audio, and encode each target audio to obtain a first audio data packet corresponding to each voice audio, and transmit each first audio data packet and the spatial position information corresponding to each voice audio to the cloud forwarding server. In this way, the target terminal may receive a plurality of first audio data packets and corresponding spatial position information. In order to facilitate the target terminal to fully and accurately convey the voice audio of the first game user, the embodiments of this disclosure support performing buffer sorting on a plurality of first audio data packets and corresponding spatial position information after receiving the plurality of first audio data packets and the corresponding spatial position information. The so-called buffer ordering refers to performing sorting storage on the received signals (such as the plurality of first audio data packets and the corresponding spatial position information) in the order in which the source terminal is generated, so that when the target audio in the plurality of first audio data packets is played in the order of buffer sorting, the content that the first game user wants to express may be prepared to be transmitted.

Furthermore, as described in step S202 above, the source terminal is to transmit the first audio data packet generated after encoding the target audio to the cloud data forwarding server, so that the cloud data forwarding server forwards the first audio data packet to the target terminal. Then after the target terminal receives the first audio data packet forwarded by the cloud data forwarding server, the first audio data packet may also be decoded to obtain the target audio. Decoding is a process of decompressing the first audio data packet by using a decompression algorithm and restoring the target audio. The encoding process corresponds to the decoding process, that is, the target terminal needs to decompress the first audio data packet by using the decompression algorithm corresponding to the compression algorithm used by the source terminal.

Steps S1001-S1018 show the flow of the source terminal, the target terminal, and the server (such as a cloud configuration server, a cloud signaling server, and a cloud data forwarding server) jointly executing the audio processing method. The following provides an execution body of each step in combination with FIG. 11a, FIG. 11b, and FIG. 11c.

The source terminal may perform steps S1001-S1006, and the specific implementation process shown in steps S1013-S1015. A source terminal executes step S1001-S1006, and reference may be made to FIG. 11a for the schematic flowchart of steps S1013-S1015. As shown in FIG. 11a, the process of the source terminal executing the audio processing method includes: start (such as enabling a target game) →initialize the target game→set a first virtual object→turn on a microphone→obtain a voice audio of a first game user→sound pre-processing→first transformation processing (such as Fourier transform)→overtone characterization (such as modifying overtone frequency domain information corresponding to the voice audio)→second transformation processing (such as inverse Fourier transform)→encode-→obtain spatial position information of the first virtual object→transmit the target audio and the spatial position information to a cloud data forwarding server→end (such as releasing system hardware and software resources to exit the target game). It is to be illustrated that the specific implementation of the process may refer to the relevant description shown in FIG. 2 or FIG. 10, and details are not repeated here. In addition, in the specific implementation process, all the steps in the above process do not have to be fully executed, for example, overtone characterization may not be performed on the voice audio of the first game user, so that during playback of the voice audio, the stereo auditory feeling may still be experienced, but the timbre of the voice audio is similar to the real sound of the first game user.

The cloud server includes a cloud configuration server, a cloud signaling server, and a cloud data forwarding server, and different cloud servers have different functions in the audio processing method. For example, the cloud data forwarding server is configured to implement data forwarding between the source terminal and the target terminal. The process of the cloud data forwarding server executing the audio processing method is provided below with reference to FIG. 11b. As shown in FIG. 11b, the process of the cloud data forwarding server executing the audio processing method includes: start→initialize the system (such as in response to a system resource application, preparing to receive data (such as voice audio))→receive data (such as cyclically receiving the voice audio and spatial position information transmitted by the source terminal)→forward the data (such as forwarding the received data to the target terminal, such as step S1016)→end (such as releasing the system hardware and software resources to exit the target game). The specific implementation of the process may refer to the relevant description shown in FIG. 2 FIG. 8, or FIG. 10, and details are not repeated here.

The target terminal may perform steps S1007-S1012, and the specific implementation process shown in steps S1017-S1018. A target terminal executes step S1007-S1012, and reference may be made to FIG. 11c for the schematic flowchart of steps S1017-S1018. As shown in FIG. 11c, the process of the target terminal executing the audio processing method includes: start→initialize the target game→buffer sorting→decode→obtain the spatial position information of the first virtual object→play the target audio according to the spatial position information→end. The specific implementation of the process may refer to the relevant description shown in FIG. 8 or FIG. 10, and details are not repeated here.

It is worth noting that the embodiments of this disclosure do not limit the order of execution of each step in steps S1001-S1018. For example, steps S1001-S1003 may be executed to realize the initialization of the target game by the source terminal, and then step S1007-S1009 may be executed to realize the initialization of the target terminal to the target game. Alternatively, steps S1001-S1003 and S1007-S1009 are executed simultaneously. Alternatively, steps S1007-S1009 are executed to realize the initialization of the target terminal to the target game, and then steps S1001-S1003 are executed to realize the initialization of the source terminal to the target game. In addition, steps S1001-S1018 are only part of the flow steps of the audio processing method. In the actual application scenario, the audio processing method may also include other steps. The embodiments of this disclosure do not limit the specific implementation steps of the audio processing method.

In the embodiments of this disclosure, on the one hand, conversion processing may be performed on the voice audio of the first game user, so that the target audio subjected to the conversion processing matches the character attribute of the first virtual object, which ensures that the target audio may accurately convey the content that the first game user wants to express, and avoid exposing the real sound of the first game user and improve the privacy and interest of the sound by adjusting the timbre of the target audio to match the character attribute of the first virtual object. On the other hand, the spatial position information of the first virtual object in the game scene may be obtained, so that in a case of playing the target audio based on the spatial position information of the first virtual object, three-dimensional position information of the first virtual object in the game scene may be characterized to provide a more realistic stereoscopic spatial sense.

The method of the embodiments of this disclosure is described in detail above, in order to facilitate better implementation of the above method of the embodiments of this disclosure, accordingly, the apparatus of the embodiments of this disclosure is provided below.

Figure 12:
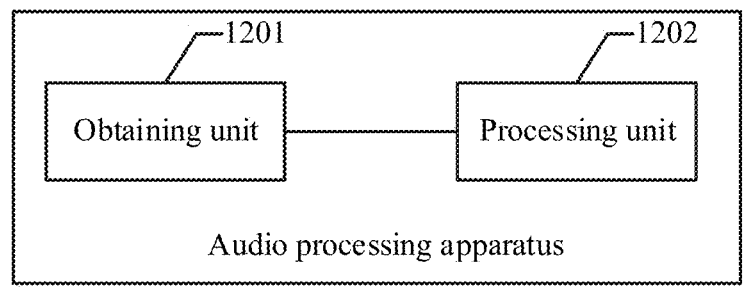
FIG. 12 is a schematic structural diagram of an audio processing apparatus according to an exemplary embodiment of this disclosure.

FIG. 12 is a schematic structural diagram of an audio processing apparatus according to an exemplary embodiment of this disclosure. The audio processing apparatus may be a computer program (including a program code) running in the source terminal. The audio processing apparatus may be configured to execute some or all steps in the method embodiment as shown in FIG. 2 and FIG. 10. The audio processing apparatus includes the following units:

an obtaining unit 1201, configured to obtain a voice audio of a first game user and spatial position information of a first virtual object controlled by the first game user in a game scene;

a processing unit 1202, configured to perform conversion processing on the voice audio of the first game user to obtain a target audio matching a character attribute of the first virtual object; and the processing unit 1202, further configured to transmit the target audio and the spatial position information of the first virtual object to a second game user, so that the second game user plays the target audio according to the spatial position information of the first virtual object, a second virtual object controlled by the second game user and the first virtual object being in a same game scene.

In an implementation, when being configured to perform conversion processing on the voice audio of the first game user to obtain a target audio matching a character attribute of the first virtual object, the processing unit 1202 is specifically configured to:

perform first transformation processing on the voice audio of the first game user, and extract frequency domain information of the voice audio of the first game user, the frequency domain information including fundamental tone frequency domain information and overtone frequency domain information;

perform modification on the overtone frequency domain information according to the character attribute of the first virtual object to obtain modified overtone frequency domain information; and fuse the fundamental tone frequency domain information and the modified overtone frequency domain information, and perform second transformation processing on fused frequency domain information to obtain a target audio matching the character attribute of the first virtual object.

In an implementation, when being configured to perform modification on the overtone frequency domain information according to the character attribute of the first virtual object to obtain modified overtone frequency domain information, the processing unit 1202 is specifically configured to:

obtain audio configuration information corresponding to the character attribute of the first virtual object, the audio configuration information including overtone configuration information, and the audio configuration information being determined according to the character attribute of the first virtual object, or the audio configuration information being determined according to the game scene; and perform modification on the overtone frequency domain information according to the overtone configuration information to obtain the modified overtone frequency domain information.

In an implementation, the spatial position information of the first virtual object includes: target coordinates of the first virtual object in the game scene determined based on a coordinate origin. When being configured to obtain spatial position information of a first virtual object controlled by the first game user in a game scene, the processing unit 1202 is specifically configured to:

determine a target point in the game scene as the coordinate origin, the target point in the game scene including: a camera or a light source point; and establish a spatial coordinate system according to the coordinate origin, and generate the target coordinates of the first virtual object based on the spatial coordinate system.

In an implementation, the spatial position information of the first virtual object includes: target distance information and orientation information between the first virtual object and the second virtual object. When being configured to obtain spatial position information of a first virtual object controlled by the first game user in a game scene, the processing unit 1202 is specifically configured to:

obtain first position information of the first virtual object in the game scene, and second position information of the second virtual object in the game scene;

perform a distance operation on the first position information and the second position information to obtain the target distance information between the first virtual object and the second virtual object; and perform an orientation operation on the first position information and the second position information to obtain the orientation information between the first virtual object and the second virtual object.

In an implementation, when being configured to transmit the target audio and the spatial position information of the first virtual object to a second game user, the processing unit 1202 is specifically configured to:

encode the target audio to generate a first audio data packet, and transmit the first audio data packet to the second game user via a first data channel; and transmit the spatial position information of the first virtual object to the second game user by using a second data channel.

The first data channel is different from the second data channel.

In an implementation, when being configured to transmit the target audio and the spatial position information of the first virtual object to a second game user, the processing unit 1202 is specifically configured to:

encode the target audio to generate a first audio data packet;

add the spatial position information of the first virtual object to the first audio data packet; and transmit the first audio data packet added with the spatial position information of the first virtual object to the second game user.

According to an embodiment of this disclosure, units of the audio processing apparatus shown in FIG. 12 may be respectively or wholly combined into one or several other units, or one (or more) of the units herein may further be divided into a plurality of units of smaller functions. In this way, same operations may be implemented, and implementation of the technical effects of the embodiments of this disclosure is not affected. The foregoing units are divided based on logical functions. In an actual application, the function of a unit may be implemented by a plurality of units, or functions of a plurality of units are implemented by a unit. In another embodiment of this disclosure, the audio processing apparatus may also include another unit. In practical applications, these functions may also be cooperatively implemented by another unit and may be cooperatively implemented by a plurality of units.

The term "unit" refers to computing software, firmware, hardware, and/or various combinations thereof. At a minimum, however, units are not to be interpreted as software that is not implemented on hardware, firmware, or recorded on a non-transitory processor readable recordable storage medium. Indeed "unit" is to be interpreted to include at least some physical, non-transitory hardware such as a part of a processor, circuitry, or computer. Two different units can share the same physical hardware (e.g., two different units can use the same processor and network interface). The units described herein can be combined, integrated, separated, and/or duplicated to support various applications. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

Figure 10:
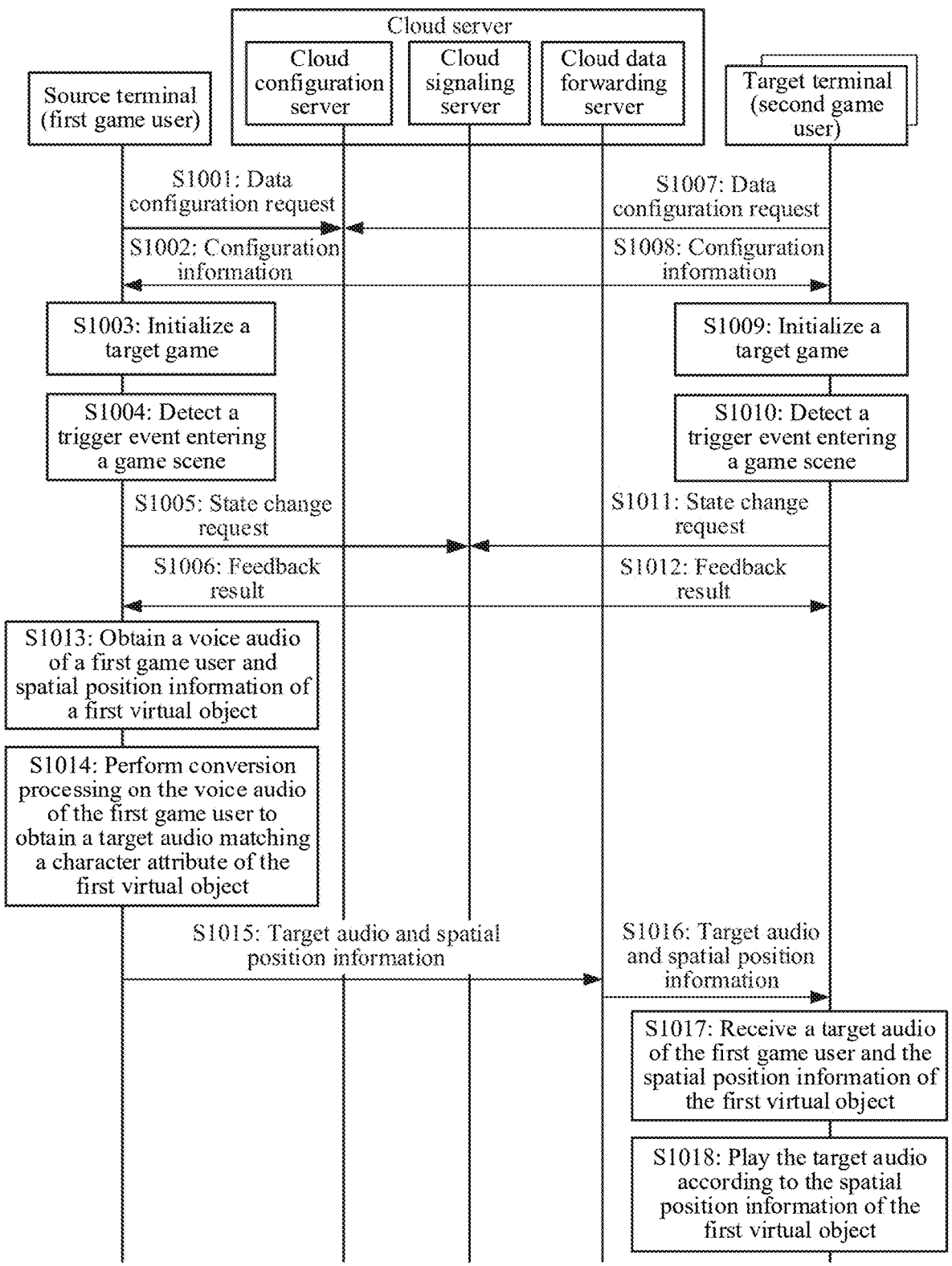
FIG. 10 is a schematic flowchart of an audio processing method according to an exemplary embodiment of this disclosure.
Figure 11A:
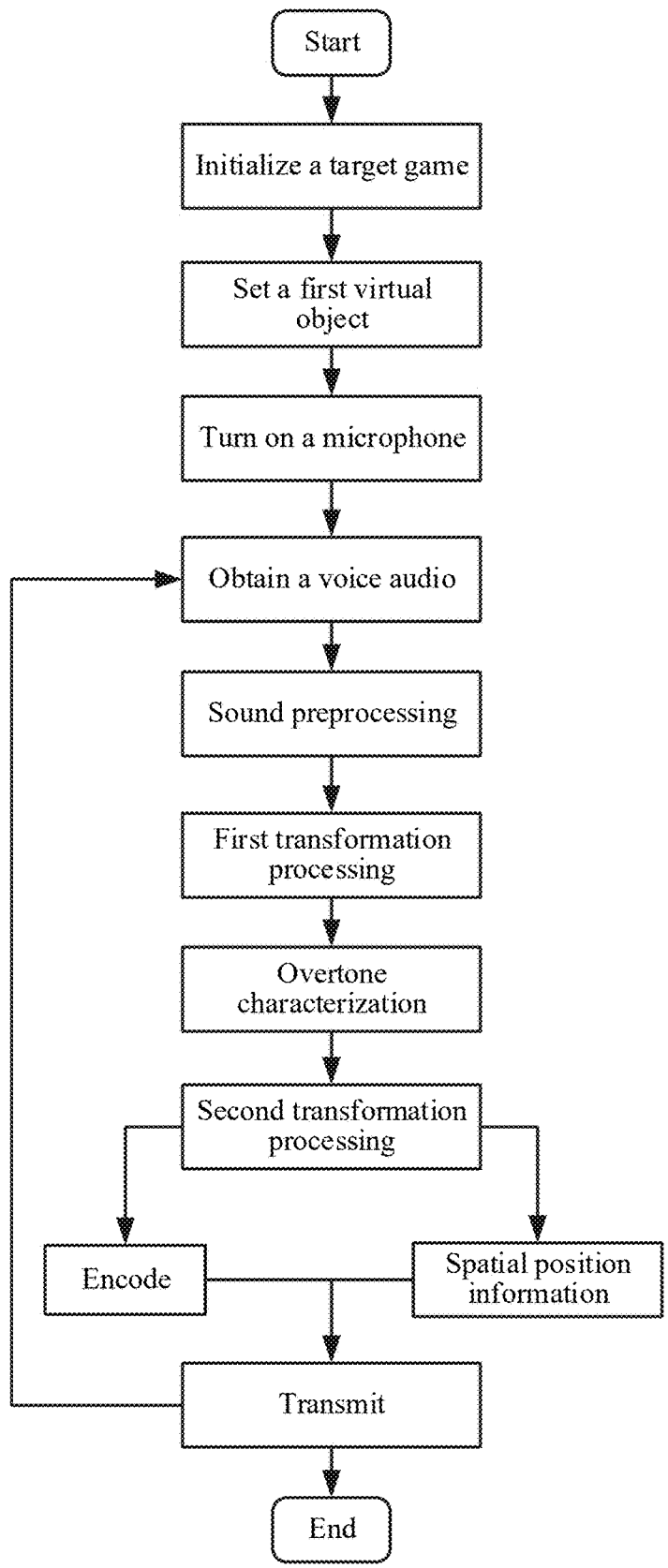
FIG. 11a is a schematic flowchart of an audio processing method executed by a source terminal according to an exemplary embodiment of this disclosure.
Figure 11B:
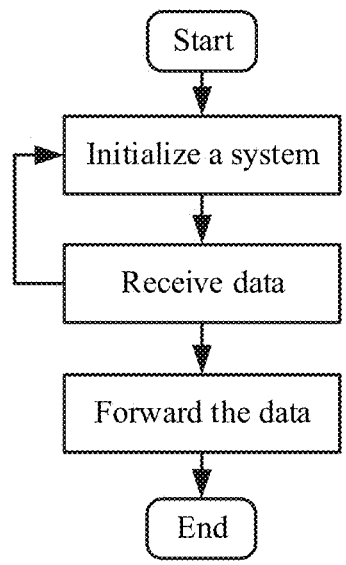
FIG. 11b is a schematic flowchart of an audio processing method executed by a cloud forwarding server according to an exemplary embodiment of this disclosure.
Figure 11C:
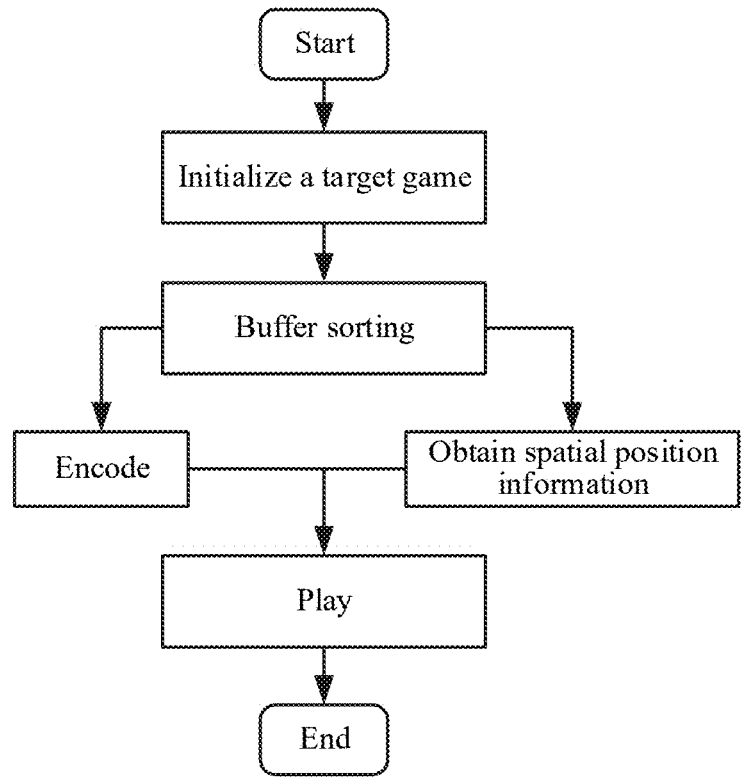
FIG. 11c is a schematic flowchart of an audio processing method executed by a target terminal according to an exemplary embodiment of this disclosure.

According to another embodiment of this disclosure, a computer program (including a program code) that may perform each step in the corresponding method as shown in FIG. 2 and FIG. 10 may be run on a general-purpose computing device, for example, a computer, that includes a processing element and a storage element such as a central processing unit (CPU), a random access memory (RAM), and a read-only memory (ROM), to construct the audio processing apparatus as shown in FIG. 12, and to implement the audio processing method according to the embodiment of this disclosure. The computer program may be recorded in, for example, a computer readable recording medium, and may be loaded into the foregoing computing device by using the computer readable recording medium, and run in the computing device.

In the embodiments of this disclosure, on the one hand, the processing unit 1202 is configured to perform conversion processing on the voice audio of the first game user, so that the target audio subjected to the conversion processing matches the character attribute of the first virtual object, which ensures that the target audio may accurately convey the content that the first game user wants to express, and avoid exposing the real sound of the first game user and improve the privacy and interest of the sound by adjusting the timbre of the target audio to match the character attribute of the first virtual object. On the other hand, the processing unit 1202 is configured to obtain the spatial position information of the first virtual object in the game scene, so that in a case of playing the target audio based on the spatial position information of the first virtual object, three-dimensional position information of the first virtual object in the game scene may be characterized to provide a more realistic stereoscopic spatial sense.

Figure 13:
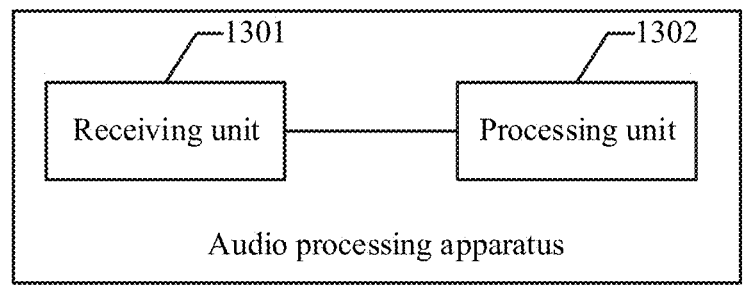
FIG. 13 is a schematic structural diagram of an audio processing apparatus according to an exemplary embodiment of this disclosure.

FIG. 13 is a schematic structural diagram of an audio processing apparatus according to an exemplary embodiment of this disclosure. The audio processing apparatus may be a computer program (including a program code) running in the source terminal. The audio processing apparatus may be configured to execute some or all steps in the method embodiment as shown in FIG. 8 and FIG. 10. The audio processing apparatus includes the following units:

a receiving unit 1301, configured to receive a target audio of a first game user and spatial position information of a first virtual object, the first virtual object being a virtual object controlled by the first game user in a game scene, and the target audio being an audio obtained by performing conversion processing on a voice audio of the first game user and matching a character attribute of the first virtual object; and a processing unit 1302, configured to play the target audio according to the spatial position information of the first virtual object, the first virtual object and a second virtual object being in a same game scene, and the second virtual object being a virtual object controlled by a second game user in the game scene.

In an implementation, when being configured to play the target audio according to the spatial position information of the first virtual object, the processing unit 1302 is specifically configured to:

determine audio playback information between the first virtual object and the second virtual object based on the spatial position information of the first virtual object, the audio playback information including audio volume information and audio orientation information; and play the target audio according to the audio playback information.

In an implementation, when being configured to determine audio playback information between the first virtual object and the second virtual object in the game scene based on the spatial position information of the first virtual object, the processing unit 1302 is specifically configured to:

obtain target distance information between the first virtual object and the second virtual object based on the spatial position information of the first virtual object;

obtain a mapping relationship between different distance information and volume information;

determine the audio volume information between the first virtual object and the second virtual object according to the mapping relationship and the target distance information; and determine the audio playback information according to the audio volume information.

In an implementation, the spatial position information of the first virtual object includes: target coordinates of the first virtual object in the game scene determined based on a coordinate origin. When being configured to determine audio playback information between the first virtual object and the second virtual object in the game scene based on the spatial position information of the first virtual object, the processing unit 1302 is specifically configured to:

obtain reference coordinates of the second virtual object in the game scene;

calculate the target coordinates and the reference coordinates to obtain the audio orientation information between the first virtual object and the second virtual object; and determine the audio playback information according to the audio orientation information.

According to an embodiment of this disclosure, units of the audio processing apparatus shown in FIG. 13 may be respectively or wholly combined into one or several other units, or one (or more) of the units herein may further be divided into a plurality of units of smaller functions. In this way, same operations may be implemented, and implementation of the technical effects of the embodiments of this disclosure is not affected. The foregoing units are divided based on logical functions. In an actual application, the function of a unit may be implemented by a plurality of units, or functions of a plurality of units are implemented by a unit. In another embodiment of this disclosure, the audio processing apparatus may also include another unit. In practical applications, these functions may also be cooperatively implemented by another unit and may be cooperatively implemented by a plurality of units. According to another embodiment of this disclosure, a computer program (including a program code) that may perform each step in the corresponding method as shown in FIG. 8 and FIG. 10 may be run on a general-purpose computing device, for example, a computer, that includes a processing element and a storage element such as a central processing unit (CPU), a random access memory (RAM), and a read-only memory (ROM), to construct the audio processing apparatus as shown in FIG. 13, and to implement the audio processing method according to the embodiment of this disclosure. The computer program may be recorded in, for example, a computer readable recording medium, and may be loaded into the foregoing computing device by using the computer readable recording medium, and run in the computing device.

In the embodiments of this disclosure, on the one hand, the processing unit 1302 is configured to perform conversion processing on the voice audio of the first game user, so that the target audio subjected to the conversion processing matches the character attribute of the first virtual object, which ensures that the target audio may accurately convey the content that the first game user wants to express, and avoid exposing the real sound of the first game user and improve the privacy and interest of the sound by adjusting the timbre of the target audio to match the character attribute of the first virtual object. On the other hand, the processing unit 1302 is configured to obtain the spatial position information of the first virtual object in the game scene, so that in a case of playing the target audio based on the spatial position information of the first virtual object, three-dimensional position information of the first virtual object in the game scene may be characterized to provide a more realistic stereoscopic spatial sense.

Figure 14:
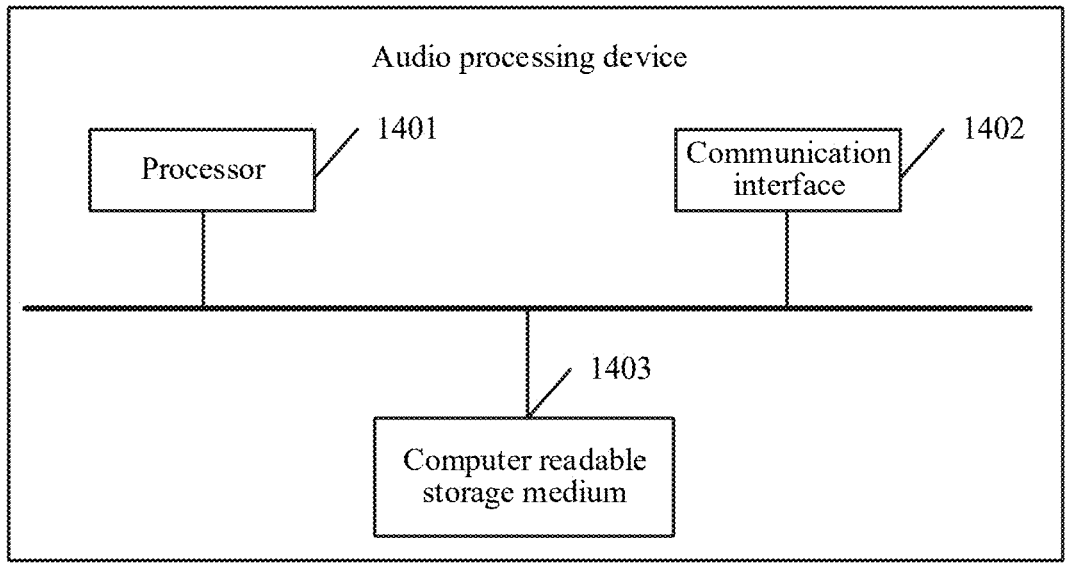
FIG. 14 is a schematic structural diagram of an audio processing device according to an exemplary embodiment of this disclosure.

FIG. 14 is a schematic structural diagram of an audio processing device according to an exemplary embodiment of this disclosure. Referring to FIG. 14, the audio processing device includes a processor 1401, a communication interface 1402, and a computer readable storage medium 1403. The processor 1401, the communication interface 1402, and the computer readable storage medium 1403 may be connected via a bus or in another manner. The communication interface 1402 is configured to receive and transmit data. The computer readable storage medium 1403 may be stored in a memory of the audio processing device. The computer readable storage medium 1403 is configured to store a computer program. The computer program includes a program instruction. The processor 1401 is configured to execute the program instruction stored by the computer readable storage medium 1403. The processor 1401 (or referred to as a central processing unit (CPU)) is a computing core and a control core of the audio processing device, and is suitable to implement one or more instructions, specifically to load and execute one or more instructions to implement corresponding method procedure or corresponding function.

Embodiments of this disclosure also provide a computer readable storage medium (memory). The computer readable storage medium is a memory device of the audio processing device for storing programs and data. It is to be understood that the computer readable storage medium here may include an internal storage medium of the audio processing device, and may also include an expanded storage medium supported by the audio processing device. The computer readable storage medium provides a storage space that stores an operating system of the audio processing device. Moreover, the storage space also stores one or more instructions that are loaded and executed by the processor 1401, and these instructions may be one or more computer programs (including program codes). It is to be illustrated that the computer readable storage medium here may be a high-speed RAM memory, or a non-transitory memory, for example, at least one magnetic disk memory. In some embodiments, the computer readable storage medium may also be at least one computer readable storage medium away from the processor.

In an embodiment, one or more instructions are stored in the computer readable storage medium. One or more instructions stored in the computer readable storage medium are loaded and executed by the processor 1401 to implement corresponding steps in the audio processing method embodiment. In specific implementation, one or more instructions stored in the computer readable storage medium are loaded and executed by the processor 1401 to implement the following steps:

obtaining a voice audio of a first game user and spatial position information of a first virtual object controlled by the first game user in a game scene;

performing conversion processing on the voice audio of the first game user to obtain a target audio matching a character attribute of the first virtual object; and transmitting the target audio and the spatial position information of the first virtual object to a second game user, so that the second game user plays the target audio according to the spatial position information of the first virtual object, where a second virtual object controlled by the second game user and the first virtual object are in a same game scene.

In an implementation, when one or more instructions in the computer readable storage medium are loaded by the processor 1401 and conversion processing is performed on the voice audio of the first game user to obtain a target audio matching a character attribute of the first virtual object, the following steps are specifically performed:

performing first transformation processing on the voice audio of the first game user, and extracting frequency domain information of the voice audio of the first game user, the frequency domain information including fundamental tone frequency domain information and overtone frequency domain information;

performing modification on the overtone frequency domain information according to the character attribute of the first virtual object to obtain modified overtone frequency domain information; and fusing the fundamental tone frequency domain information and the modified overtone frequency domain information, and performing second transformation processing on fused frequency domain information to obtain a target audio matching the character attribute of the first virtual object.

In an implementation, when one or more instructions in the computer readable storage medium are loaded by the processor 1401, and modification is performed on the overtone frequency domain information according to the character attribute of the first virtual object to obtain modified overtone frequency domain information, the following steps are specifically performed:

obtaining audio configuration information corresponding to the character attribute of the first virtual object, the audio configuration information including overtone configuration information, and the audio configuration information being determined according to the character attribute of the first virtual object, or the audio configuration information being determined according to the game scene; and performing modification on the overtone frequency domain information according to the overtone configuration information to obtain the modified overtone frequency domain information.

In an implementation, the spatial position information of the first virtual object includes: target coordinates of the first virtual object in the game scene determined based on a coordinate origin. When one or more instructions in the computer readable storage medium are loaded by the processor 1401 and the obtaining the spatial position information of the first virtual object controlled by the first game user in the game scene is performed, the following steps are specifically performed:

determining a target point in the game scene as the coordinate origin, the target point in the game scene including: a camera or a light source point; and establishing a spatial coordinate system according to the coordinate origin, and generating the target coordinates of the first virtual object based on the spatial coordinate system.

In an implementation, the spatial position information of the first virtual object includes: target distance information and orientation information between the first virtual object and the second virtual object. When one or more instructions in the computer readable storage medium are loaded by the processor 1401 and the obtaining the spatial position information of the first virtual object controlled by the first game user in the game scene is performed, the following steps are specifically performed:

obtaining first position information of the first virtual object in the game scene, and second position information of the second virtual object in the game scene;

performing a distance operation on the first position information and the second position information to obtain the target distance information between the first virtual object and the second virtual object; and performing an orientation operation on the first position information and the second position information to obtain the orientation information between the first virtual object and the second virtual object.

In an implementation, when one or more instructions in the computer readable storage medium are loaded by the processor 1401 and the transmitting the target audio and the spatial position information of the first virtual object to the second game user is performed, the following steps are specifically performed:

encoding the target audio to generate a first audio data packet, and transmitting the first audio data packet to the second game user via a first data channel; and transmitting the spatial position information of the first virtual object to the second game user by using a second data channel.

The first data channel is different from the second data channel.

In an implementation, when one or more instructions in the computer readable storage medium are loaded by the processor 1401 and the transmitting the target audio and the spatial position information of the first virtual object to the second game user is performed, the following steps are specifically performed:

encoding the target audio to generate a first audio data packet;

adding the spatial position information of the first virtual object to the first audio data packet; and transmitting the first audio data packet added with the spatial position information of the first virtual object to the second game user.

In another embodiment, one or more instructions are stored in the computer readable storage medium. One or more instructions stored in the computer readable storage medium are loaded and executed by the processor 1401 to implement corresponding steps in the audio processing method embodiment. In specific implementation, one or more instructions stored in the computer readable storage medium are loaded and executed by the processor 1401 to implement the following steps:

receiving a target audio of a first game user and spatial position information of a first virtual object, the first virtual object being a virtual object controlled by the first game user in a game scene, and the target audio being an audio obtained by performing conversion processing on a voice audio of the first game user and matching a character attribute of the first virtual object; and playing the target audio according to the spatial position information of the first virtual object, the first virtual object and a second virtual object being in a same game scene, and the second virtual object being a virtual object controlled by a second game user in the game scene.

In an implementation, when one or more instructions in the computer readable storage medium are loaded by the processor 1401 and the playing the target audio according to the spatial position information of the first virtual object is performed, the following steps are specifically performed:

determining audio playback information between the first virtual object and the second virtual object based on the spatial position information of the first virtual object, the audio playback information including audio volume information and audio orientation information; and playing the target audio according to the audio playback information.

In an implementation, when one or more instructions in the computer readable storage medium are loaded by the processor 1401 and the determining audio playback information between the first virtual object and the second virtual object in the game scene based on the spatial position information of the first virtual object is performed, the following steps are specifically performed:

obtaining target distance information between the first virtual object and the second virtual object based on the spatial position information of the first virtual object;

obtaining a mapping relationship between different distance information and volume information;

determining the audio volume information between the first virtual object and the second virtual object according to the mapping relationship and the target distance information; and determining the audio playback information according to the audio volume information.

In an implementation, the spatial position information of the first virtual object includes: target coordinates of the first virtual object in the game scene determined based on a coordinate origin. When one or more instructions in the computer readable storage medium are loaded by the processor 1401 and the determining audio playback information between the first virtual object and the second virtual object in the game scene based on the spatial position information of the first virtual object is performed, the following steps are specifically performed:

obtaining reference coordinates of the second virtual object in the game scene;

calculating the target coordinates and the reference coordinates to obtain the audio orientation information between the first virtual object and the second virtual object; and determining the audio playback information according to the audio orientation information.

In the embodiments of this disclosure, on the one hand, the processor 1401 is configured to perform conversion processing on the voice audio of the first game user, so that the target audio subjected to the conversion processing matches the character attribute of the first virtual object, which ensures that the target audio may accurately convey the content that the first game user wants to express, and avoid exposing the real sound of the first game user and improve the privacy and interest of the sound by adjusting the timbre of the target audio to match the character attribute of the first virtual object. On the other hand, the processor 1401 is configured to obtain the spatial position information of the first virtual object in the game scene, so that in a case of playing the target audio based on the spatial position information of the first virtual object, three-dimensional position information of the first virtual object in the game scene may be characterized to provide a more realistic stereoscopic spatial sense.

Embodiments of this disclosure also provide a computer program product or a computer program, the computer program product or the computer program including a computer instruction stored in a computer readable storage medium. A processor of the audio processing device reads the computer instruction from a computer readable storage medium, the computer instruction, when executed by the processor, causing the audio processing device to execute the audio processing method.

A person of ordinary skill in the art may notice that the exemplary units and algorithm steps described with reference to the embodiments disclosed in this disclosure can be implemented in electronic hardware, or a combination of computer software and electronic hardware. Executing these functions in a form of hardware or software depends on the specific application and design constraint conditions of the technical solution. A person skilled in the art may use different methods to implement the described functions for each particular application, but it should not be considered that the implementation goes beyond the scope of this disclosure.

In the foregoing embodiments, units can be implemented in whole or in part by software, hardware, firmware or a combination thereof. When implemented by software, the units can be implemented in the form of a computer program product in whole or in part. The computer program product includes one or more computer instructions. When the computer program instructions are loaded and executed on a computer, all or some of the processes or functions according to the embodiments of this disclosure are produced. The computer may be a general-purpose computer, a dedicated computer, a computer network, or another programmable device. The computer instruction may be stored in a computer readable storage medium or transmitted through the computer readable storage medium. The computer instruction may be transmitted from a website, computer, server or data center in a wired (such as a coaxial cable, an optical fiber, a digital subscriber line (DSL)) or wireless (such as infrared, wireless, microwave, etc.) manner to another website, computer, server or data center. The computer readable storage medium may be any available medium capable of being accessed by a computer or include one or more data processing devices integrated by an available medium, such as a server and a data center. The available medium may be a magnetic medium (for example, a soft disk, a hard disk, or a magnetic tape), an optical medium (for example, a DVD), a semiconductor medium (for example, a Solid State Disk (SSD)), or the like.

The descriptions above are only implementations of this disclosure. However, the scope of protection of this disclosure is not limited thereto. Within the technical scope disclosed by this disclosure, any variation or substitution that can be easily conceived of by those skilled in the art should all fall within the scope of protection of this disclosure. Therefore, the scope of protection of this disclosure should be determined by the scope of protection of the appended claims.

What is claimed is:

1. An audio processing method, executed by a first terminal, comprising:
    obtaining a voice audio of a first game user and spatial position information of a first virtual object controlled by the first game user in a game scene;
    performing conversion processing on the voice audio of the first game user to obtain a target audio matching a character attribute of the first virtual object; and
    transmitting the target audio and the spatial position information of the first virtual object to a second terminal such that the second terminal plays the target audio according to the spatial position information of the first virtual object, a second virtual object controlled by a second game user using the second terminal and the first virtual object being in a same game scene.

2. The method according to claim 1, wherein the performing the conversion processing on the voice audio of the first game user to obtain the target audio comprises:
    performing first transformation processing on the voice audio of the first game user to extract frequency domain information of the voice audio of the first game user, the frequency domain information comprising fundamental tone frequency domain information and overtone frequency domain information;
    performing modification on the overtone frequency domain information according to the character attribute of the first virtual object to obtain modified overtone frequency domain information;
    fusing the fundamental tone frequency domain information and the modified overtone frequency domain information; and
    performing second transformation processing on fused frequency domain information to obtain the target audio matching the character attribute of the first virtual object.

3. The method according to claim 2, wherein the performing the modification on the overtone frequency domain information according to the character attribute of the first virtual object to obtain modified overtone frequency domain information comprises:
    obtaining audio configuration information corresponding to the character attribute of the first virtual object, the audio configuration information comprising overtone configuration information; and
    performing modification on the overtone frequency domain information according to the overtone configuration information to obtain the modified overtone frequency domain information.

4. The method according to claim 3, wherein the obtaining the audio configuration information comprises:
    determining the audio configuration information according to the character attribute of the first virtual object or according to the game scene.

5. The method according to claim 1, wherein the spatial position information of the first virtual object comprises target coordinates of the first virtual object in the game scene determined based on a coordinate origin, and the obtaining the spatial position information of the first virtual object comprises:
    determining a target point in the game scene as the coordinate origin, the target point in the game scene comprising a camera or a light source point; and
    establishing a spatial coordinate system according to the coordinate origin; and
    generating the target coordinates of the first virtual object based on the spatial coordinate system.

6. The method according to claim 1, wherein the spatial position information of the first virtual object comprises target distance information and orientation information between the first virtual object and the second virtual object, and the obtaining the spatial position information of the first virtual object comprises:
    obtaining first position information of the first virtual object in the game scene, and second position information of the second virtual object in the game scene;
    performing a distance operation on the first position information and the second position information to obtain the target distance information between the first virtual object and the second virtual object; and
    performing an orientation operation on the first position information and the second position information to obtain the orientation information between the first virtual object and the second virtual object.

7. The method according to claim 1, wherein the transmitting the target audio and the spatial position information of the first virtual object to the second terminal comprises:
    encoding the target audio to generate a first audio data packet;
    transmitting the first audio data packet to the second terminal via a first data channel; and transmitting the spatial position information of the first virtual object to the second terminal via a second data channel, wherein the first data channel is different from the second data channel.

8. The method according to claim 1, wherein the transmitting the target audio and the spatial position information of the first virtual object to the second terminal comprises:
encoding the target audio to generate a first audio data packet;
adding the spatial position information of the first virtual object to the first audio data packet; and
transmitting the first audio data packet including the spatial position information of the first virtual object to the second terminal.

9. An audio processing method, executed by a second terminal, comprising:
receiving a target audio of a first game user and spatial position information of a first virtual object from a first terminal, the first virtual object being a virtual object controlled by the first game user using the first terminal in a game scene, and the target audio being an audio obtained by performing conversion processing on a voice audio of the first game user and the target audio matching a character attribute of the first virtual object; and
playing the target audio according to the spatial position information of the first virtual object, the first virtual object and a second virtual object controlled by a second game user being in a same game scene.

10. The method according to claim 9, wherein the playing the target audio according to the spatial position information of the first virtual object comprises:
determining audio playback information between the first virtual object and the second virtual object based on the spatial position information of the first virtual object, the audio playback information comprising audio volume information and audio orientation information; and
playing the target audio according to the audio playback information.

11. The method according to claim 10, wherein the determining the audio playback information comprises:
obtaining target distance information between the first virtual object and the second virtual object based on the spatial position information of the first virtual object;
obtaining a mapping relationship between different distance information and volume information;
determining the audio volume information between the first virtual object and the second virtual object according to the mapping relationship and the target distance information; and
determining the audio playback information according to the audio volume information.

12. The method according to claim 10, wherein the spatial position information of the first virtual object comprises target coordinates of the first virtual object in the game scene determined based on a coordinate origin, and the determining the audio playback information comprises:
obtaining reference coordinates of the second virtual object in the game scene;
determining the audio orientation information between the first virtual object and the second virtual object based on the target coordinates and the reference coordinates; and
determining the audio playback information according to the audio orientation information.

13. An audio processing apparatus, comprising:
a memory operable to store computer-readable instructions; and
a processor circuitry operable to read the computer-readable instructions, the processor circuitry when executing the computer-readable instructions is configured to:
obtain a voice audio of a first game user and spatial position information of a first virtual object controlled by the first game user in a game scene;
perform conversion processing on the voice audio of the first game user to obtain a target audio matching a character attribute of the first virtual object; and
transmit the target audio and the spatial position information of the first virtual object to a second terminal such that the second terminal plays the target audio according to the spatial position information of the first virtual object, a second virtual object controlled by a second game user using the second terminal and the first virtual object being in a same game scene.

14. The apparatus according to claim 13, wherein the processor circuitry is configured to:
perform first transformation processing on the voice audio of the first game user to extract frequency domain information of the voice audio of the first game user, the frequency domain information comprising fundamental tone frequency domain information and overtone frequency domain information;
perform modification on the overtone frequency domain information according to the character attribute of the first virtual object to obtain modified overtone frequency domain information;
fuse the fundamental tone frequency domain information and the modified overtone frequency domain information; and
perform second transformation processing on fused frequency domain information to obtain the target audio matching the character attribute of the first virtual object.

15. The apparatus according to claim 13, wherein the processor circuitry is configured to:
obtain audio configuration information corresponding to the character attribute of the first virtual object, the audio configuration information comprising overtone configuration information; and
perform modification on the overtone frequency domain information according to the overtone configuration information to obtain the modified overtone frequency domain information.

16. The apparatus according to claim 13, wherein the spatial position information of the first virtual object comprises target coordinates of the first virtual object in the game scene determined based on a coordinate origin, and the processor circuitry is configured to:
determine a target point in the game scene as the coordinate origin, the target point in the game scene comprising a camera or a light source point; and
establish a spatial coordinate system according to the coordinate origin; and
generate the target coordinates of the first virtual object based on the spatial coordinate system.

17. The apparatus according to claim 13, wherein the spatial position information of the first virtual object comprises target distance information and orientation information between the first virtual object and the second virtual object, and the processor circuitry is configured to:

obtain first position information of the first virtual object in the game scene, and second position information of the second virtual object in the game scene;

perform a distance operation on the first position information and the second position information to obtain the target distance information between the first virtual object and the second virtual object; and perform an orientation operation on the first position information and the second position information to obtain the orientation information between the first virtual object and the second virtual object.

18. The apparatus according to claim 13, wherein the processor circuitry is configured to:

encode the target audio to generate a first audio data packet;

transmit the first audio data packet to the second terminal via a first data channel; and transmit the spatial position information of the first virtual object to the second terminal via a second data channel, wherein the first data channel is different from the second data channel.

19. The apparatus according to claim 13, wherein the processor circuitry is configured to:

encode the target audio to generate a first audio data packet;

add the spatial position information of the first virtual object to the first audio data packet; and transmit the first audio data packet including the spatial position information of the first virtual object to the second terminal.

20. The apparatus according to claim 13, wherein the processor circuitry is configured to:

determine the audio configuration information according to the character attribute of the first virtual object or according to the game scene.

\* \* \* \* \*